US007920694B2

(12) United States Patent
Cruz-Hernandez et al.

(10) Patent No.: US 7,920,694 B2
(45) Date of Patent: Apr. 5, 2011

(54) GENERATION OF CONSISTENT HAPTIC EFFECTS

(75) Inventors: Juan Manuel Cruz-Hernandez, Montreal (CA); Danny A. Grant, Montreal (CA)

(73) Assignee: Immersion Corporation, San Jose, CA (US)

( * ) Notice: Subject to any disclaimer, the term of this patent is extended or adjusted under 35 U.S.C. 154(b) by 1308 days.

(21) Appl. No.: 11/421,683

(22) Filed: Jun. 1, 2006

(65) Prior Publication Data

US 2007/0202841 A1 Aug. 30, 2007

Related U.S. Application Data

(60) Provisional application No. 60/765,075, filed on Feb. 3, 2006.

(51) Int. Cl.
*H04M 1/00* (2006.01)
*H04M 3/00* (2006.01)

(52) U.S. Cl. .................................................. 379/374.03

(58) Field of Classification Search .............. 379/374.03
See application file for complete search history.

(56) References Cited

U.S. PATENT DOCUMENTS 5,519,637 A * 5/1996 Mathur ........................ 700/280
2002/0177419 A1 11/2002 Hwang
2004/0204147 A1 10/2004 Nielsen
2005/0134561 A1 6/2005 Tierling et al.
2005/0151592 A1 * 7/2005 Partridge et al. ................ 331/16

FOREIGN PATENT DOCUMENTS

EP 0 265 309 A1 4/1988
JP 200456623 2/2004

OTHER PUBLICATIONS

European Search Report for corresponding European Application No. 09178934.7 mailed Mar. 26, 2010.

* cited by examiner

*Primary Examiner* — Alexander Jamal

(74) *Attorney, Agent, or Firm* — Squire, Sanders & Dempsey, LLP

(57) ABSTRACT

A system generates a consistent haptic effect in a handset that includes an actuator. The system determines performance data for the actuator, and generates haptic effect controller parameters from the performance data by comparing the performance data with reference performance data derived from a reference actuator. The system then stores the haptic effect controller parameters on the handset.

39 Claims, 23 Drawing Sheets

Ideal acceleration and envelope graphs

Measured acceleration and envelope graphs

Frequency vs. peak to peak acceleration (Top), and vs. envelope size in % (Bottom)

Generation of unidirectional pulses and their acceleration profiles

Generation of bidirectional pulses and their acceleration profiles. The negative pulse is always 500msec long enough to see the signal slow down and spin up again Stop time for unidirectional and bidirectional pulses Example of a fixed width unidirectional pulse at different frequencies Frequency vs. Magnitude plots for unidirectional pulses Example of a fixed width bidirectional pulse at different frequencies Frequency vs. Magnitude plots for bidirectional pulses Frequency vs. Envelope plots for bidirectional pulses Envelope and Magnitude constrains for the Smooth controller Envelope and Magnitude constrains for the Strong controller Envelope and Magnitude constrains for the Sharp controller Handset locations where to extract features to create the reference features matrix $$A_{pp} = \begin{bmatrix} a_{1,1}^{pp} & a_{1,2}^{pp} & a_{1,3}^{pp} & a_{1,4}^{pp} & a_{1,5}^{pp} & a_{1,6}^{pp} \\ a_{2,1}^{pp} & a_{2,2}^{pp} & a_{2,3}^{pp} & a_{2,4}^{pp} & a_{2,5}^{pp} & a_{2,6}^{pp} \\ a_{3,1}^{pp} & a_{3,2}^{pp} & a_{3,3}^{pp} & a_{3,4}^{pp} & a_{3,5}^{pp} & a_{3,6}^{pp} \\ a_{4,1}^{pp} & a_{4,2}^{pp} & a_{4,3}^{pp} & a_{4,4}^{pp} & a_{4,5}^{pp} & a_{4,6}^{pp} \\ a_{5,1}^{pp} & a_{5,2}^{pp} & a_{5,3}^{pp} & a_{5,4}^{pp} & a_{5,5}^{pp} & a_{5,6}^{pp} \\ a_{6,1}^{pp} & a_{6,2}^{pp} & a_{6,3}^{pp} & a_{6,4}^{pp} & a_{6,5}^{pp} & a_{6,6}^{pp} \\ a_{7,1}^{pp} & a_{7,2}^{pp} & a_{7,3}^{pp} & a_{7,4}^{pp} & a_{7,5}^{pp} & a_{7,6}^{pp} \end{bmatrix}$$

215

$$T_{stop} = \begin{bmatrix} t_{1,1}^{stop} & t_{1,2}^{stop} & t_{1,3}^{stop} & t_{1,4}^{stop} & t_{1,5}^{stop} & t_{1,6}^{stop} \\ t_{2,1}^{stop} & t_{2,2}^{stop} & t_{2,3}^{stop} & t_{2,4}^{stop} & t_{2,5}^{stop} & t_{2,6}^{stop} \\ t_{3,1}^{stop} & t_{3,2}^{stop} & t_{3,3}^{stop} & t_{3,4}^{stop} & t_{3,5}^{stop} & t_{3,6}^{stop} \\ t_{4,1}^{stop} & t_{4,2}^{stop} & t_{4,3}^{stop} & t_{4,4}^{stop} & t_{4,5}^{stop} & t_{4,6}^{stop} \\ t_{5,1}^{stop} & t_{5,2}^{stop} & t_{5,3}^{stop} & t_{5,4}^{stop} & t_{5,5}^{stop} & t_{5,6}^{stop} \\ t_{6,1}^{stop} & t_{6,2}^{stop} & t_{6,3}^{stop} & t_{6,4}^{stop} & t_{6,5}^{stop} & t_{6,6}^{stop} \\ t_{7,1}^{stop} & t_{7,2}^{stop} & t_{7,3}^{stop} & t_{7,4}^{stop} & t_{7,5}^{stop} & t_{7,6}^{stop} \end{bmatrix}$$

216

Fig. 20

Extraction of feature matrices for different actuator locations

Acceleration constraints scaling as per a given perception function

GENERATION OF CONSISTENT HAPTIC EFFECTS

RELATED APPLICATIONS

This application claims the benefit of U.S. Provisional Patent Application No. 60/765,075 filed Feb. 3, 2006, the specification of which is herein incorporated by reference.

FIELD OF THE INVENTION

One embodiment of the present invention is directed to devices that include haptic effects. More particularly, one embodiment of the present invention is directed to the generation of consistent haptic effects across different mobile devices.

BACKGROUND INFORMATION

A haptic effect for mobile wireless devices or handsets, or non-wireless devices such as portable gaming machines and gaming console controllers, is typically the generation of different types of vibrations at the handset to provide vibrotactile feedback to the user. Mobile handsets that may include haptic effects, such as cellular telephones and personal digital assistants ("PDAs"), come in different shapes and sizes, utilize different actuators to generate vibrations, and therefore by nature are mechanically different. As a result, when designing a handset with a haptic effect, the vibrations as sensed by a user will vary greatly depending on this difference. To provide a haptic effect that is similar across this difference, or even effective to the user, each mobile handset design must be modified based on these unique characteristics. Even with design changes, the result may be that the different handsets will generate a wide range of vibrotactile sensations to the user.

For example, one haptic effect might be the generation of a series of three distinct pulses. With one type of handset having a motor with certain braking characteristics, the user will clearly feel the three pulses. However, the same haptic effect implemented on a handset having a motor with different braking characteristics may appear to the user as more muddled, to the point where the user cannot determine the number of distinct pulses.

It is desirable for a haptic effect to be consistent across many different handsets, so that a user will not have to adjust to a different feel of the vibrations, and so that the haptic effect will convey the same information (e.g., three pulses) to the user on different handsets. Therefore, there is a need for a method and system for generating haptic effects that are consistent across different mobile handsets.

SUMMARY OF THE INVENTION

One embodiment of the present invention is a system that generates a consistent haptic effect in a handset that includes an actuator. The system determines performance data for the actuator, and generates haptic effect controller parameters from the performance data by comparing the performance data with reference performance data derived from a reference actuator. The system then stores the haptic effect controller parameters on the handset.

BRIEF DESCRIPTION OF THE DRAWINGS

FIG. 20 illustrates two examples of a features matrix.

DETAILED DESCRIPTION

One embodiment of the present invention is a system and method which, based on a defined "reference" handset and haptic effects that are designed for the reference handset, allows the same haptic effects to feel consistent to a user on other types of handsets without having to modify the haptic effects.

Handsets, such as, for example, cellular telephones, PDAs, and portable game systems, come in different shapes and sizes, utilize different actuators to produce vibrations, and therefore by nature are mechanically different. When designing a handset with a haptic effect such as a vibrotactile response, a commonality with one embodiment of the present invention among all the variations of handsets is a kernel or a controller embedded in the processor of each handset. In one embodiment of the present invention, this kernel is modified, within each handset, to achieve similar consistent performance (i.e., the vibration sensation to a user) among all of handsets while playing the same vibrotactile effect. This avoids the need for individually tuning every single handset.

One embodiment of the present invention is a method that determines controller parameters that will provide a consistent experience among different cell phone handsets and actuators when using the same vibrotactile/haptic effects. The kernel is modified to implement these methods and generate the determined controller parameters.

Figure 1:
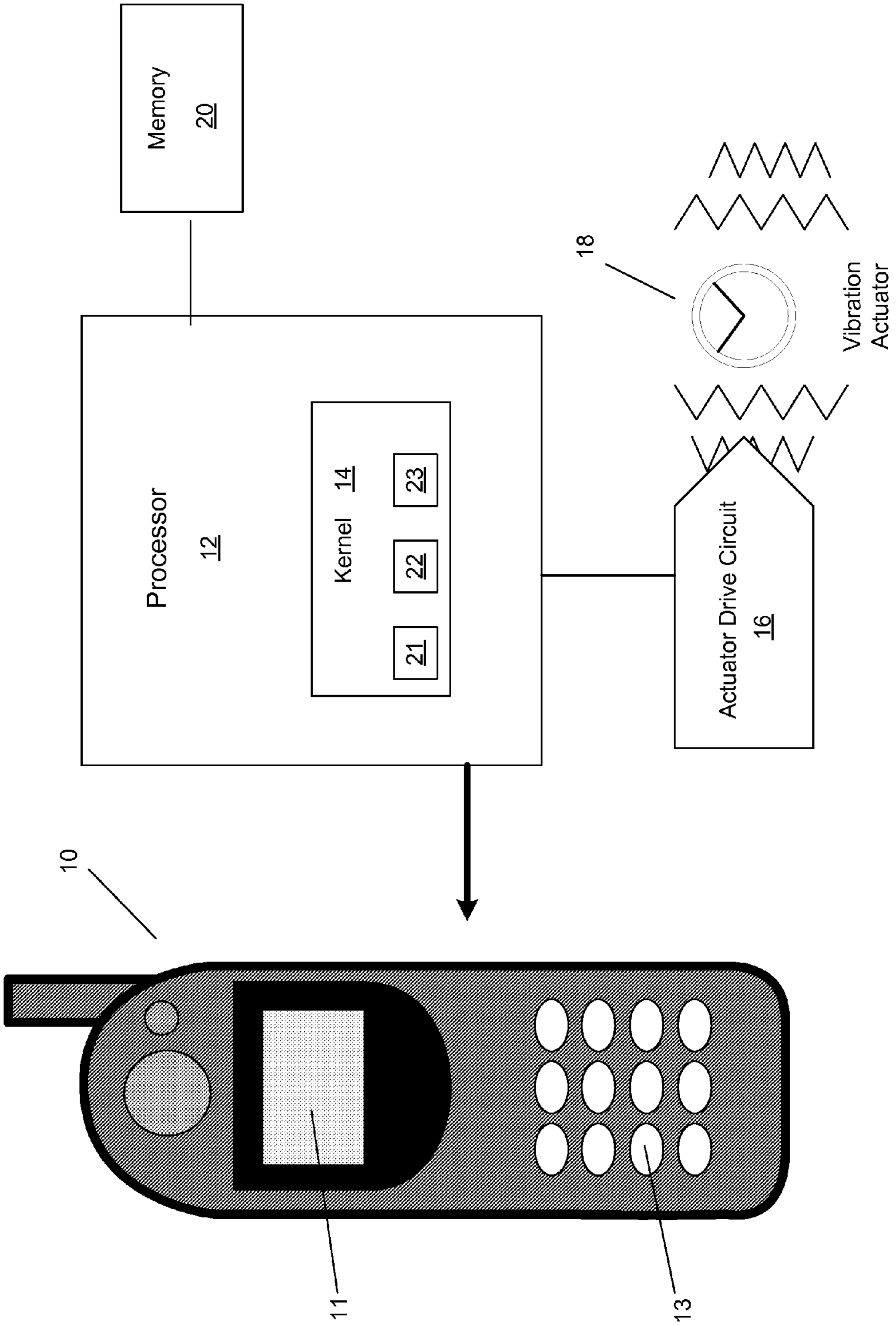
FIG. 1 is a block diagram of a cellular telephone handset in accordance with one embodiment of the present invention.

FIG. 1 is a block diagram of a cellular telephone handset 10 in accordance with one embodiment of the present invention. Handset 10 includes a screen 11 and keys 13. In one embodiment, keys 13 are mechanical type keys. In another embodiment, keys 13 can be implemented by a touch screen so that keys 13 are touch screen keys, or can be implemented using any method. Internal to handset 10 is a haptic effects system that generates vibrations on telephone 10. In one embodiment, the vibrations are generated on the entire telephone 10. In other embodiments, specific portions of handset 10 can be haptically enabled by the haptic effects system, including individual keys of keys 13, whether the keys are mechanically oriented, touch screen, or some other type of implementation.

The haptic effects system includes a processor 12, which includes a kernel 14. Coupled to processor 12 is a memory device 20 and an actuator drive circuit 16, which is coupled to vibration actuator 18. Although handset 10 is illustrated as a telephone, embodiments of the present invention can be implemented with any type of handset or mobile device. Kernel 14 includes one or more controllers 21-23 which are each responsible for generating specific haptic effects.

Processor 12 may be any type of general purpose processor, or could be a processor specifically designed to provide haptic effects, such as an application-specific integrated circuit ("ASIC"). Processor 12 may be the same processor that operates the entire handset 10, or may be a separate processor. In one embodiment, kernel 14 is a software process executed by processor 12. Processor 12 decides what haptic effects are to be played and the order in which the effects are played. Controllers 21-23 convert high level controller parameters from kernel 14 to motor command/control signals. In general, the high level parameters that define a particular haptic effect include magnitude, frequency and duration.

Processor 12 outputs the control signals to drive circuit 16 which includes electronic components and circuitry used to supply actuator 18 with the required electric current to cause the desired haptic effects. For example, the current provided by drive circuit 16 to actuator 18 can have varying magnitudes of positive and negative current. Further, the current may be in the form of periodic signals with varying periods and/or phases.

Vibration actuator 18 is a haptic device that generates a vibration on handset 10. Actuator 18 can include one or more force applying mechanisms which are capable of applying a vibrotactile force to a user of handset 10 (e.g., via the housing of handset 10). This force can be transmitted, for example, in the form of vibrational movement caused by a rotating mass, a piezo-electric device, or other vibrating actuator type. Actuator 18 may be an Eccentric Rotating Mass ("ERM") in which an eccentric mass is moved by a motor, or a Linear Resonant Actuator ("LRA") in which a mass attached to a spring is driven back and forth.

Memory device 20 can be any type of storage device, such as random access memory ("RAM") or read-only memory ("ROM"). Memory device 20 stores instructions executed by processor 12. Memory device 20 may also be located internal to processor 12, or any combination of internal and external memory.

Controllers 21-23 in one embodiment are stored instructions and controller parameters that define haptic effects that are eventually converted to vibrational movement by vibrational actuator 18. In one embodiment, the controllers 21-23 store parameters that define smooth, strong and sharp haptic effects, respectively. In one embodiment, the sharp haptic effect includes active braking (i.e., the ability to reverse the actuator motor) through the use of bidirectional pulses which allows for relatively narrow pulses. The smooth and strong haptic effects do not include active braking and only utilize unidirectional pulses.

Figure 2:
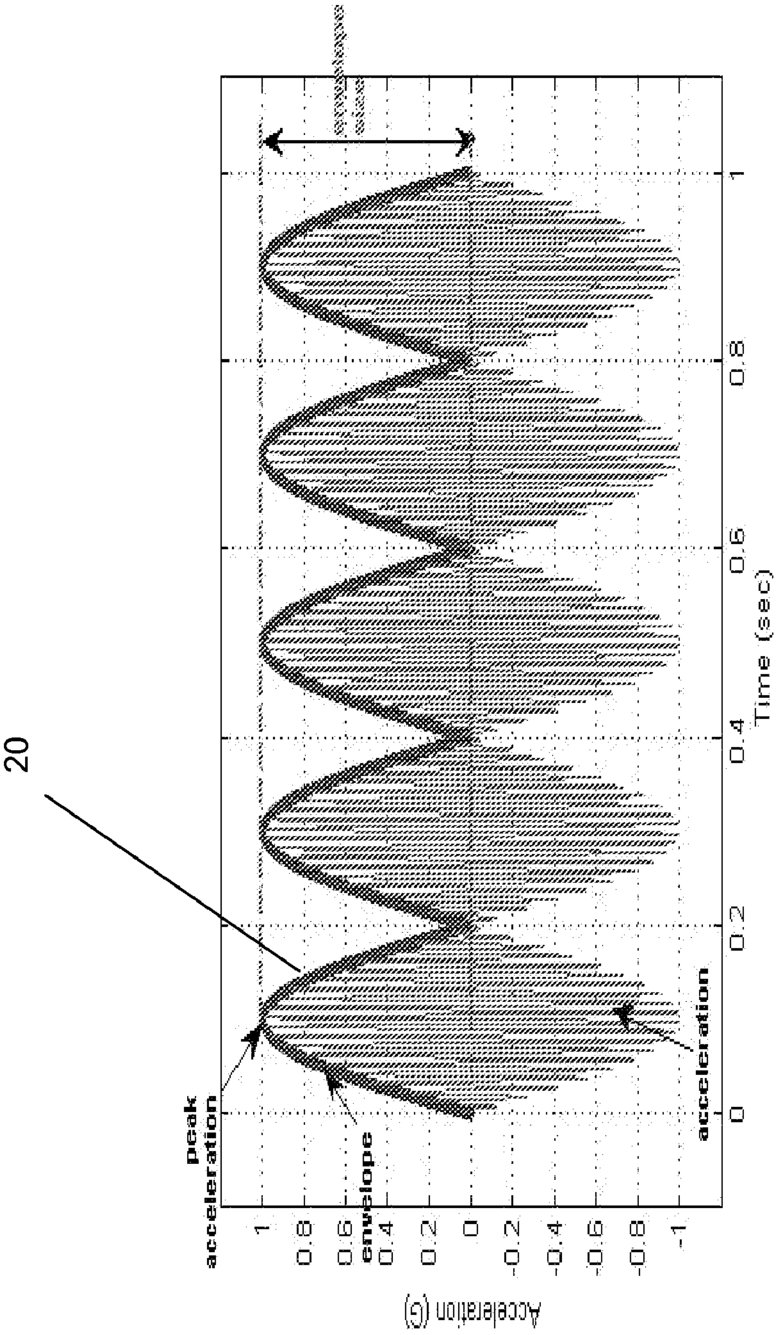
FIG. 2 is a graph of acceleration vs. time for an idealized handset having haptic effects produced by shaping high frequency vibrations.

In one embodiment of the present invention, the performance of a controller for a handset selected to be a reference handset is characterized in order to define the haptic effects of the reference handset. One criteria for choosing a reference handset is that the haptic effects generated by the reference handset are acceptable to a user. FIG. 2 is a graph of acceleration vs. time for an idealized handset having haptic effects produced by shaping high frequency vibrations and that can be used to illustrate the process of characterizing controller performance. In one embodiment, the controller performance can be characterized by the measure of an envelope 20 produced by the commanded low frequency envelope of the high frequency vibrations. These vibrations produce an acceleration profile that can be quantified by measuring the peak to peak acceleration and the size of the envelope, from the lowest point to the highest. The envelope value is a metric to measure the performance of a handset/actuator that produces vibrations in the low frequency range.

Envelope 20 is measured as a percentage of the peak acceleration of the vibration with respect to the size of the envelope. When the envelope is the same size as the peak acceleration of the vibration (as in FIG. 2), the ratio is 1 or 100% and this indicates a distinct frequency pattern. When the envelope is smaller than the peak acceleration, the ratio will be smaller than 100%. The closer to 0%, the more indistinct successive pulses will be felt.

Figure 3:
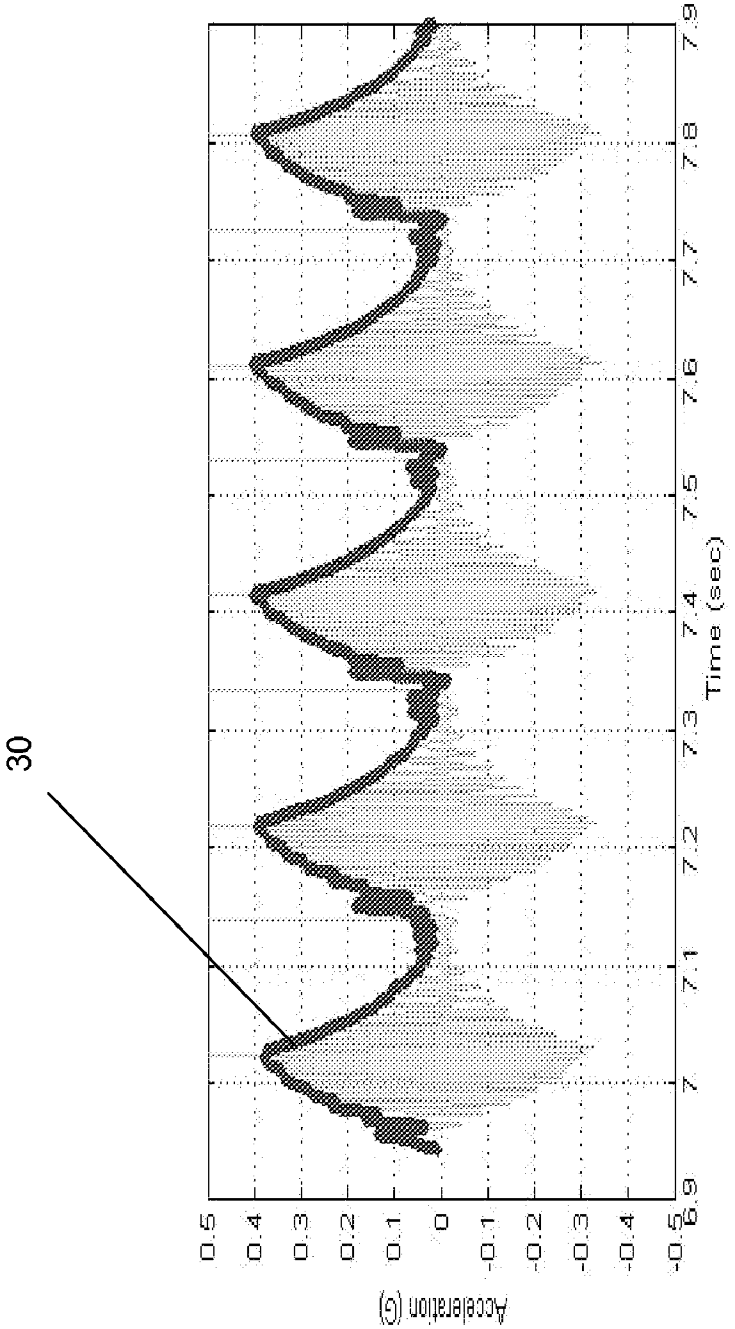
FIG. 3 is a graph of acceleration vs. time for an actual handset that was selected as a reference handset in accordance with one embodiment of the present invention.

FIG. 3 is a graph of acceleration vs. time for an actual handset that was selected as a reference handset in accordance with one embodiment of the present invention. One criteria for selecting a particular handset as a reference handset is that the haptic effects implemented on the reference handset are considered "good", i.e., an acceptable implementation to a user. In one embodiment, an accelerometer is used to measure the acceleration of the vibrations. As shown in FIG. 3, envelope 30 is approximately 95% compared to the idealized 100%.

Figure 4:
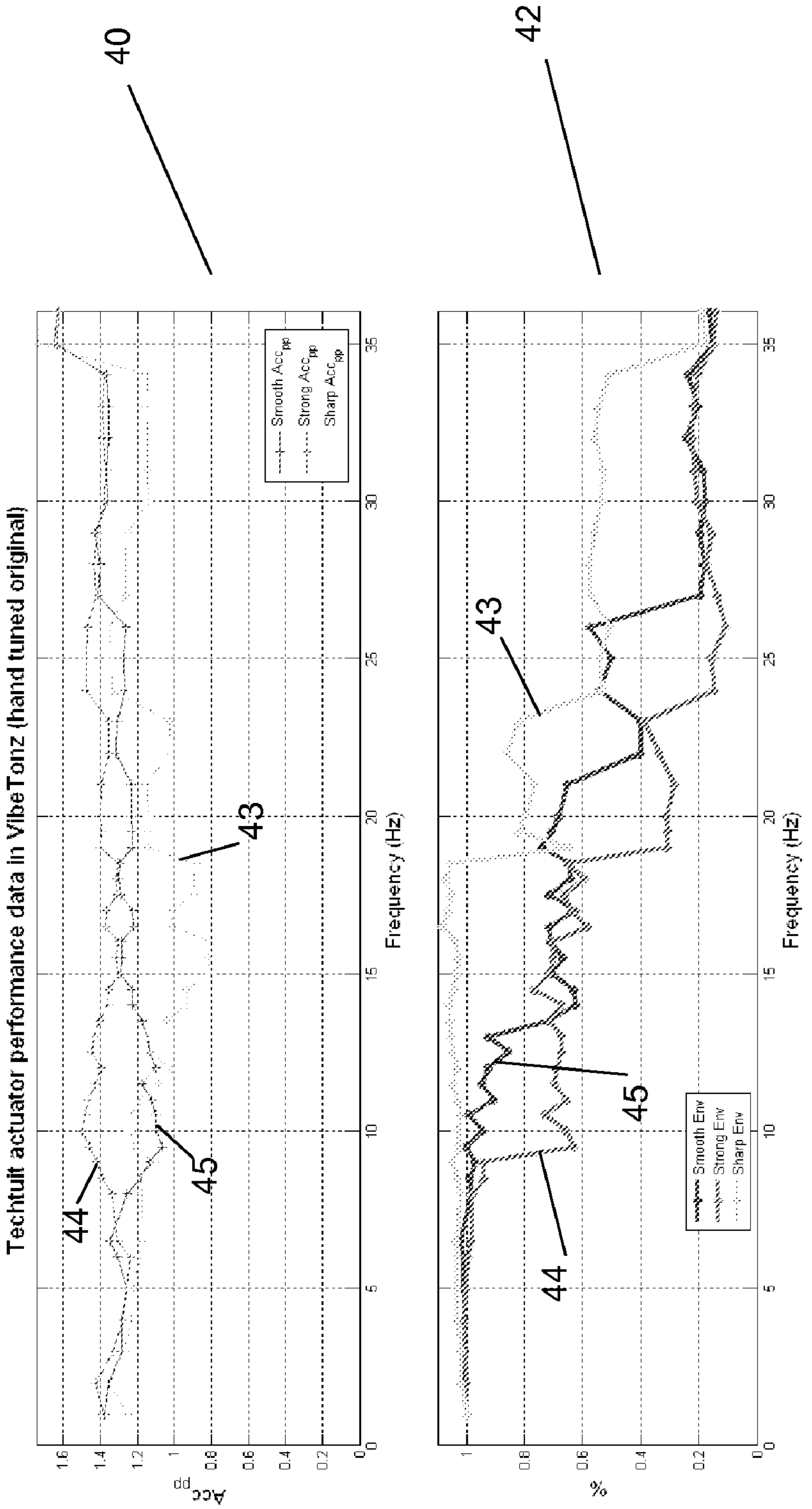
FIG. 4 are graphs of acceleration vs. input frequency and envelope percent vs. input frequency of an actuator of a reference handset in accordance with one embodiment of the present invention.

In one embodiment, in order to characterize the reference handset, a measurement of the envelope across a wide range of frequencies is generated to quantify the complete performance of the reference handset. FIG. 4 are graphs of acceleration vs. input frequency (upper graph 40) and envelope percent vs. input frequency (lower graph 42) of an actuator of a reference handset in accordance with one embodiment of the present invention. An accelerometer measures the acceleration of the vibrations and from these measurements the measure of the envelope is extracted. The measurements were taken for haptic effects of a smooth, strong and sharp controller.

The envelope graph (graph 42) is related to the bandwidth of the actuator with the controller. As disclosed above, it is desired to have envelopes with values close to 100% for most of the frequency range. As shown in FIG. 4, the sharp effect (curve 43), the one that uses bidirectional pulses, has the largest bandwidth, as compared to the smooth effect (curve 45) and strong effect (curve 44). To a user, the sharp effect feels more distinct for a wider frequency range (up to 16-18 Hz) as opposed to the relatively narrow bandwidth of the strong (8 Hz) and smooth (10 Hz) effects.

The magnitude of the acceleration (graph 40) gives a measure of the strength of the vibration. The magnitude and size of the envelope depends on the width of the pulses. When the width is narrow, the actuator will not have time to spin to its maximum velocity therefore producing a low acceleration with a 100% envelope and allowing it to have a larger frequency. When the width is wide, the actuator will have time to reach its maximum velocity producing a larger acceleration, but also it will take more time to slow down, therefore producing a smaller envelope as soon as the frequency is increased. This is what creates a reduction in bandwidth.

Similar measurements with similar results as FIG. 4 in one embodiment were measured for the reference handset. Therefore, it was concluded that the handset performance depends mainly on the performance of the actuator for the fundamental created vibrations. If the controller is well tuned for an actuator in the actuator test bed, the same controller will produce similar performance in the handset. If there is a problem with the mounting of the actuator or other resonances present in the handset, any diversion from the original actuator performance will immediately highlight these problems.

In one embodiment, once the reference data for the handset/actuator is determined ("the reference handset or actuator"), the next step is to determine the controller parameters for the new handset/actuator ("the new handset or actuator") that is to have haptic effects consistent with the reference handset. In order to determine the controller parameters, the following general steps in one embodiment are performed:

1. Find the maximum and optimal stop time for different pulse widths for the new actuator. These times correspond to the free response and the response using a brake, respectively.
2. Generation/Capture of raw data for the new actuator:
   a. Generate unidirectional and bidirectional pulses at different frequencies to generate pulse widths;
   b. Capture of acceleration profiles for each pulse width;
   c. Measure magnitude and envelope values from the captured acceleration profiles;
   d. Store the data in a matrix of Magnitude vs. Frequency and Envelope vs. Frequency
3. Determine the controller parameters using the matrices and the reference data. This is done by finding the intersection of the measured data from the new actuator and reference data of the reference actuator plus/minus some appropriate values. The intersection highlights pulse widths, frequencies and duty cycles that the new controller will use to generate the periodic signals.
4. Load the kernel with the computed controller parameters.

A description of each of these steps is graphically illustrated below for a new handset/actuator in accordance with one embodiment of the present invention.

Finding the Stop and Brake Time

Figure 5:
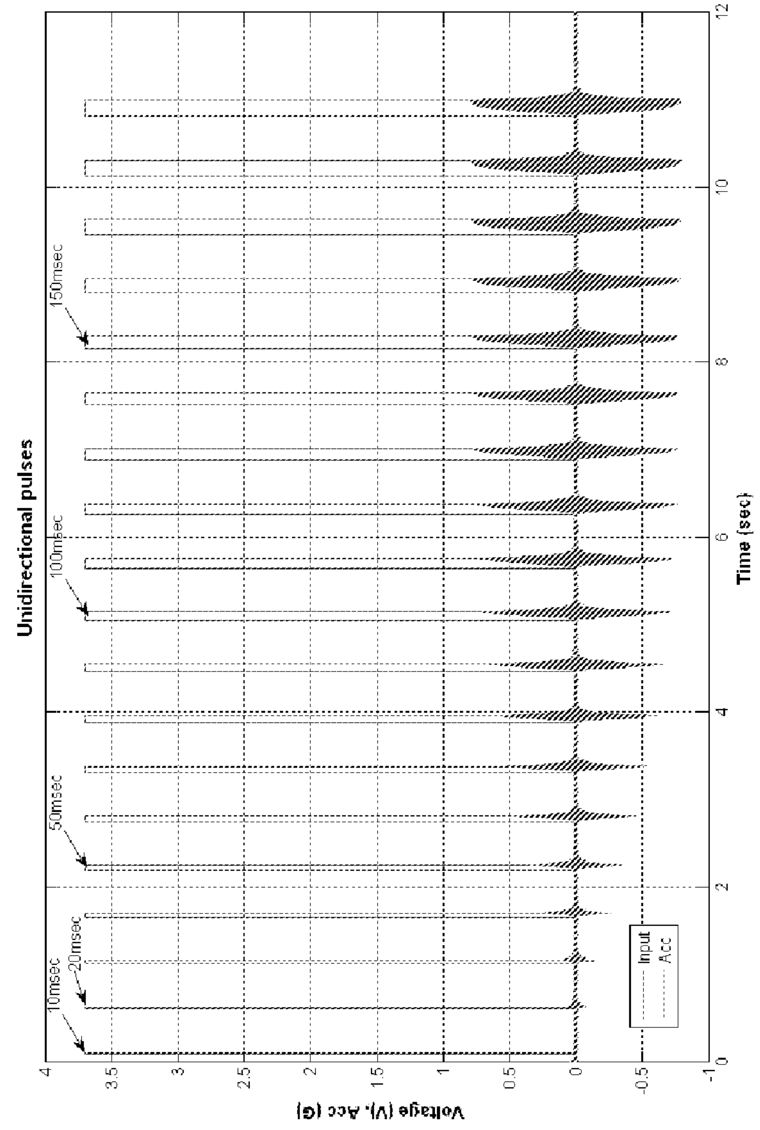
FIG. 5 is a graph of Voltage, Acceleration vs. Time for a new actuator in accordance with one embodiment of the present invention.

FIG. 5 is a graph of Voltage, Acceleration vs. Time for a new actuator in accordance with one embodiment of the present invention that shows the generation of unidirectional pulses and the corresponding acceleration profiles. The stop time or the maximum time that the actuator takes to stop spinning after the input signals have been removed, is computed for several pulse widths.

Figure 6:
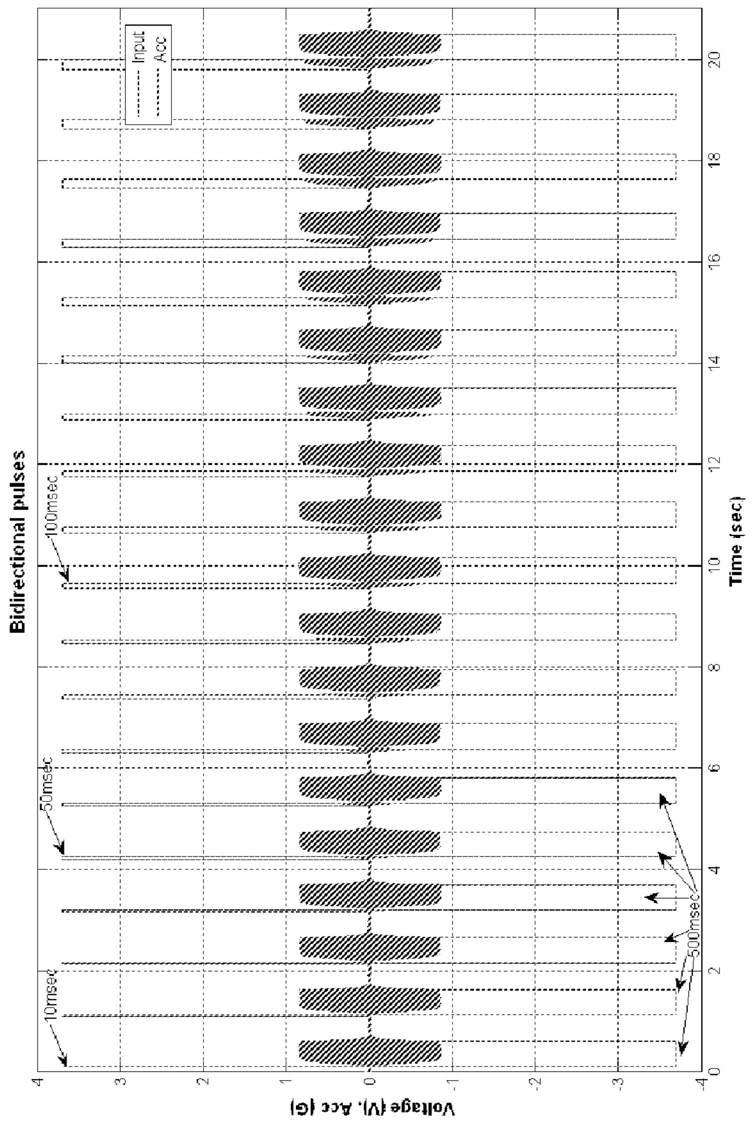
FIG. 6 is a graph of Voltage, Acceleration vs. Time for a new actuator in accordance with one embodiment of the present invention.

FIG. 6 is a graph of Voltage, Acceleration vs. Time for a new actuator in accordance with one embodiment of the present invention that shows the generation of bidirectional pulses and the corresponding acceleration profiles. The brake time or the minimum time that the actuator takes to stop spinning after the (bidirectional) input signal has been removed is shown. In one embodiment, the negative pulse is always 500 ms, which is long enough to see the signal slow down and spin up again.

Figure 7:
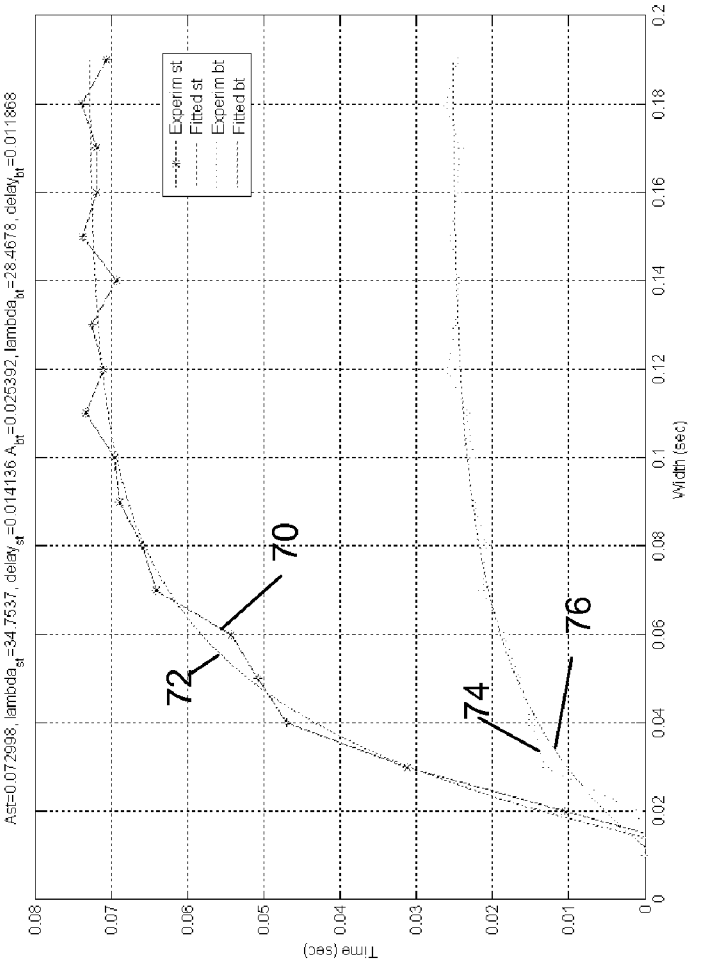
FIG. 7 is a graph of stop time vs. pulse width that provides a representation of the information of FIGS. 5-6.

FIG. 7 is a graph of stop time vs. pulse width that provides a representation of the information of FIGS. 5-6. This representation is well approximated by a first order system (or a simple exponential function) as shown in FIG. 7. Curve 70 is the measured stop time for unidirectional pulses and curve 72 is the first order approximation to curve 70. Curve 74 is the minimum stop time or brake time when using bidirectional pulses and curve 76 is its first order approximation. The graph of FIG. 7 illustrates that for unidirectional pulses, anything above 160 ms will produce the same stop time. Therefore the tests to find the controller parameters for this specific new actuator will go from a small meaningful value (30 ms) up to 160-180 ms.

Generation/Capture of Raw Data

Figure 8:
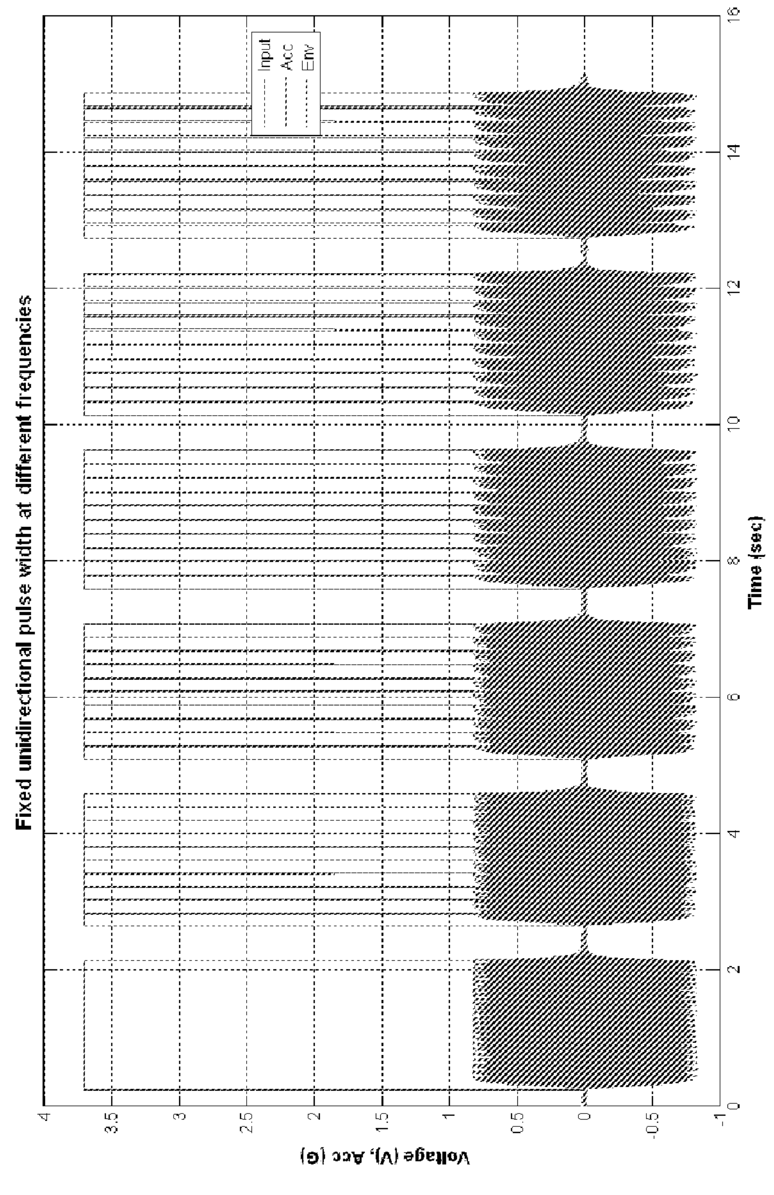
FIG. 8 is a graph of Voltage, Acceleration vs. Time for a new actuator in accordance with one embodiment of the present invention.

FIG. 8 is a graph of Voltage, Acceleration vs. Time for the new actuator in accordance with one embodiment of the present invention and illustrates a constant pulse width of 180 ms at different frequencies for unidirectional pulses. The first pulse train has 0 ms between each pulse. The second has a 10 ms space between pulses, and so on. As shown, the acceleration profile has an envelope that increases as the pulses become more separate in time, the result being a different envelope measure for each pulse train, as well as different acceleration magnitude values.

Figure 9:
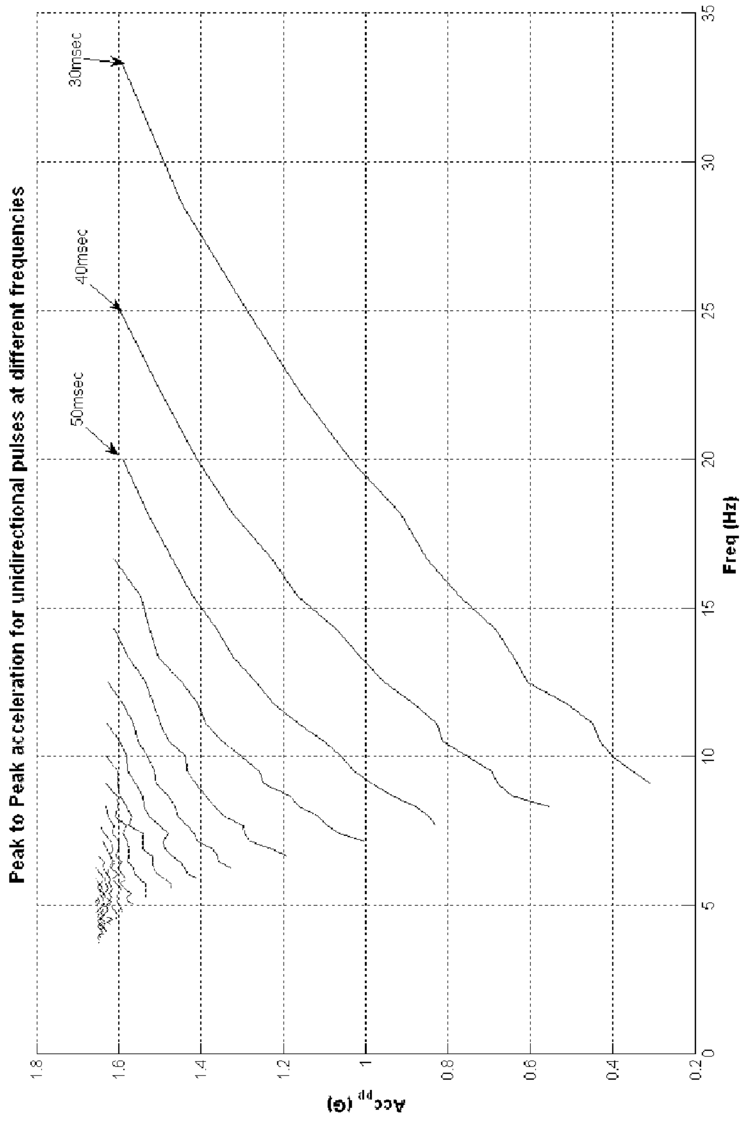
FIGS. 9 and 10 are graphical representations of matrices that store the envelope and the peak to peak acceleration for a new actuator in accordance with one embodiment of the present invention.
Figure 10:
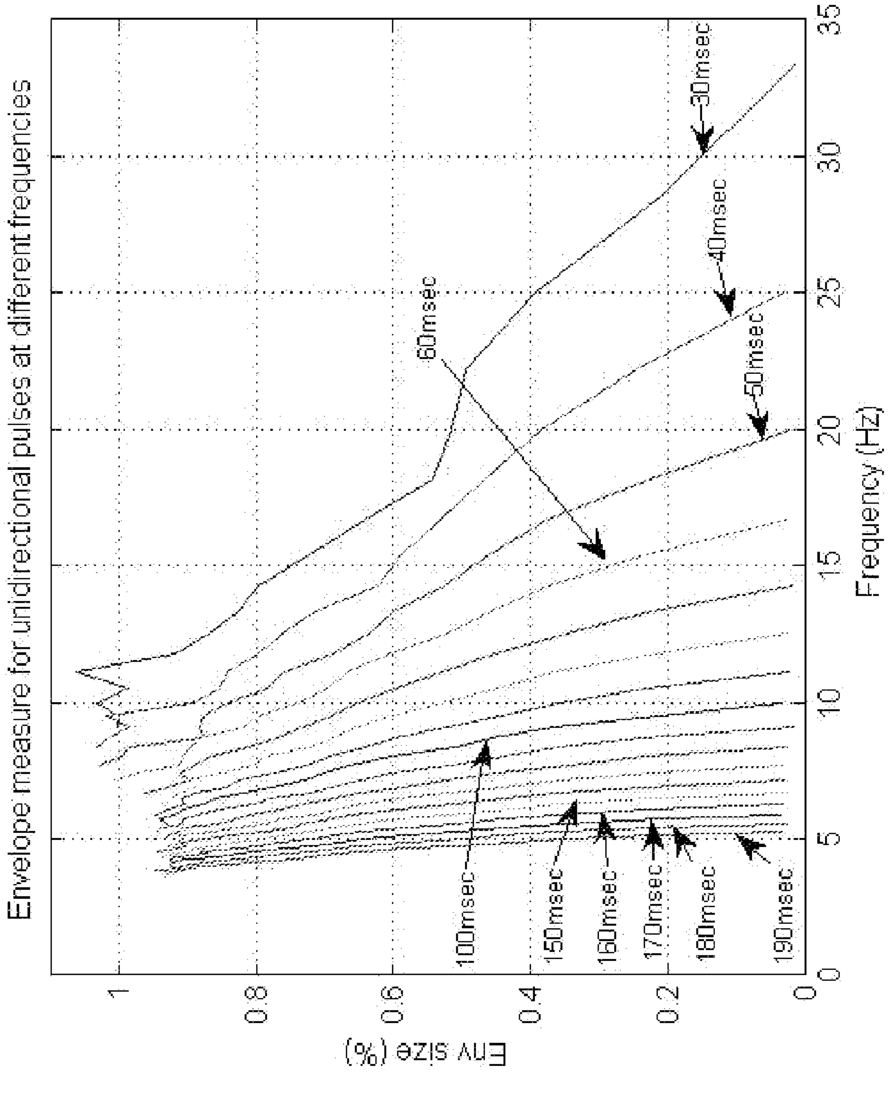

In order to fully characterize the new actuator, a similar procedure is performed but using different pulse widths as well as using bidirectional pulses. The envelope and the peak to peak acceleration is then measured and stored in matrix of frequencies vs. magnitudes and envelope values. A graphical representation of the matrices is shown in FIGS. 9 and 10 in accordance with one embodiment of the present invention for unidirectional pulses, where each curve in the magnitude graphs (FIG. 9) corresponds to a single curve in the envelope graphs (FIG. 10).

Figure 11:
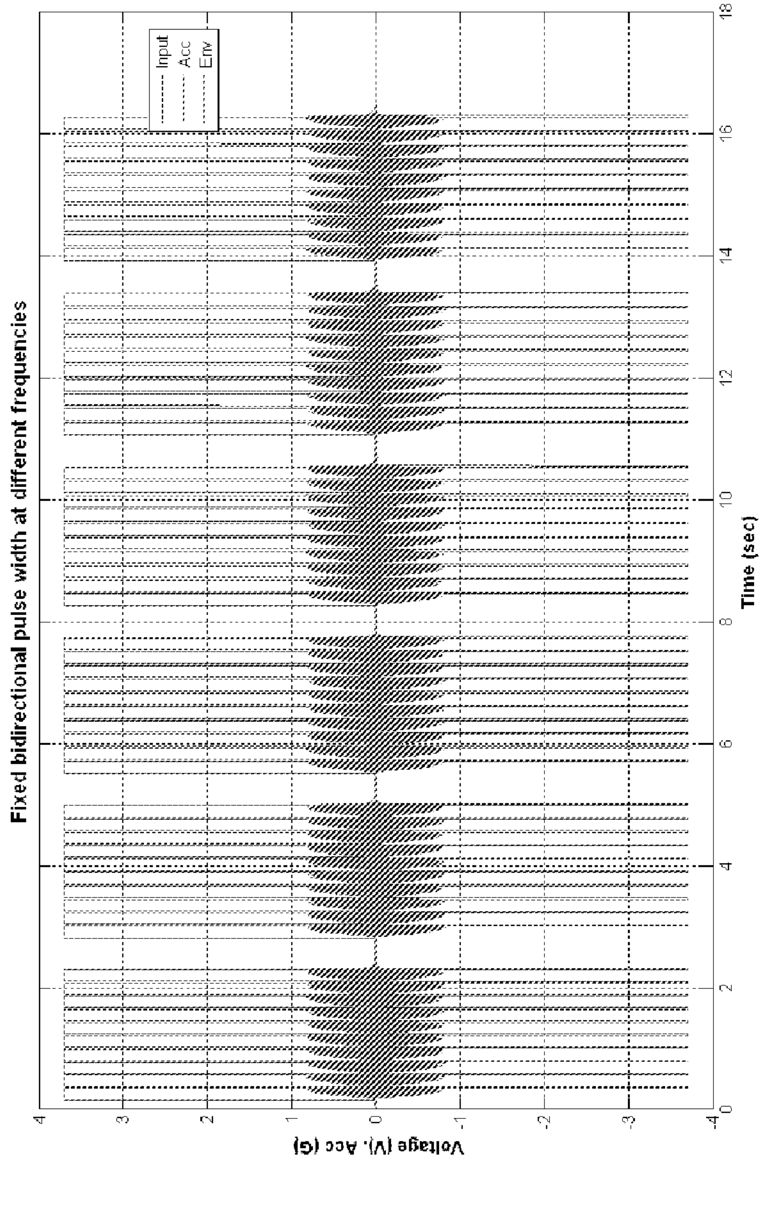
FIG. 11 is a graphical representation of pulses generated at different frequencies from a train of pulses at a new actuator in accordance with one embodiment of the present invention.

For the case of bidirectional pulses, a pulse width is first chosen and its optimal (negative) brake pulse is selected from the graph of FIG. 7. Then a train of pulses is generated with this bidirectional pulse and space in time, generating pulses at different frequencies. FIG. 11 graphically illustrates an example such a pulse. As shown, the envelope curve gives almost a full envelope due to the optimal nature of the braking pulse.

Figure 12:
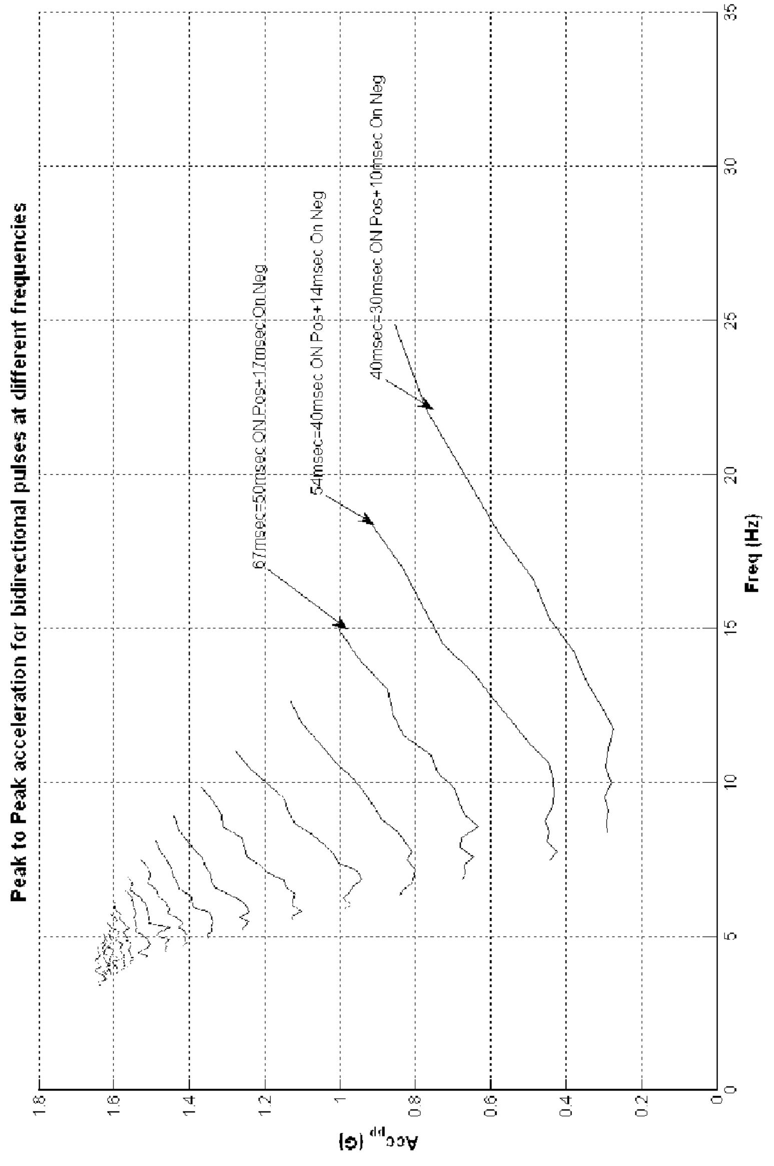
FIGS. 12 and 13 are graphs of information collected for different pulse widths at different frequencies at a new actuator in accordance with one embodiment of the present invention.
Figure 13:
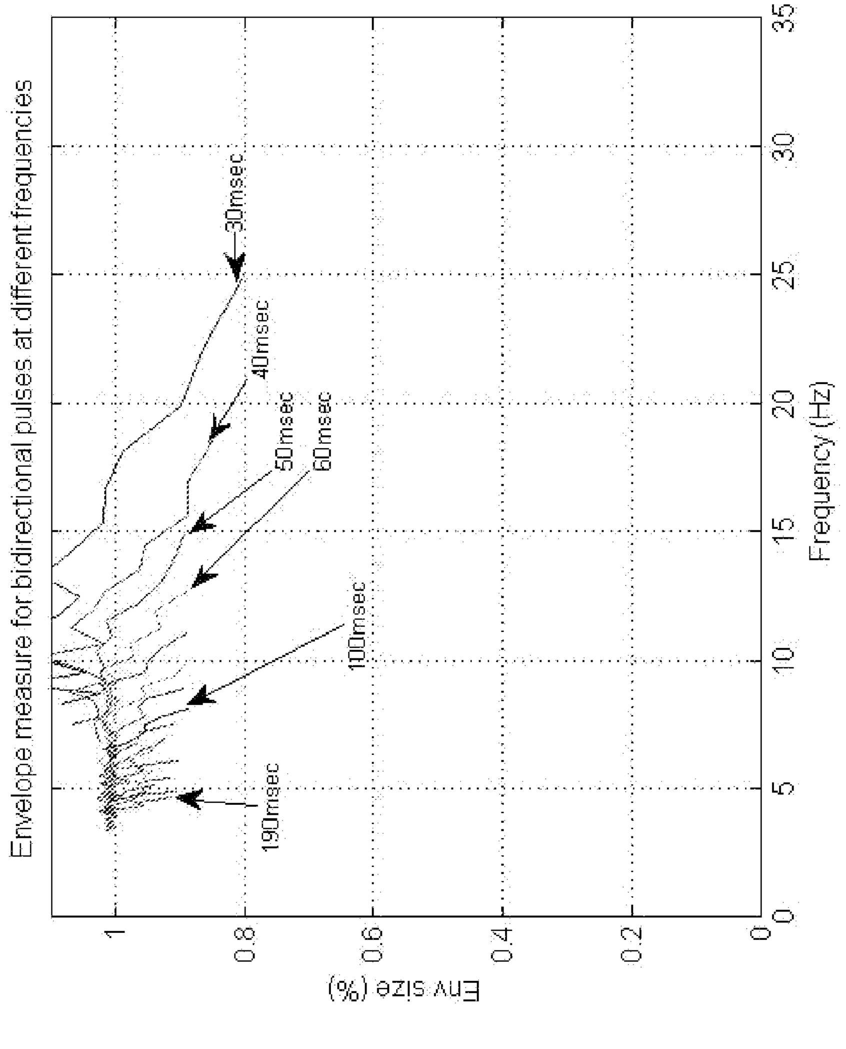

The information collected for different pulse widths at different frequencies is shown in FIGS. 12 and 13. As before for the unidirectional pulses, there is a one to one relation between the magnitude and envelope graphs (points). One clear difference between these graphs and the unidirectional graphs is that the envelope graphs are always close to the maximum value, due to the nature of the optimal brake used for all the bidirectional pulses.

Finding the Controller Parameters using the Matrices and Reference Data

Using the information of the envelope and magnitude values for the reference actuator, such as what is shown in FIG. 4, for the different controllers of the new actuator, areas where the controller needs to generate accelerations at a given magnitude with a specific envelope can be determined. The smooth and strong controllers use the data collected for unidirectional pulses (FIGS. 9 and 10) and the sharp controller will use the data collected for bidirectional pulses (FIGS. 12 and 13).

From FIG. 4 these are the requirements (constraints) needed to match the controllers in accordance with one embodiment:

1. Smooth
   - a. Envelope of the response needs to be above 0.8. This is where the bandwidth of the controller is defined.
   - b. Magnitude inside the bandwidth needs to be between 1 Gpp (peak to peak acceleration) and 1.4 Gpp.
2. Strong
   - a. Envelope of the response needs to be above 0.45. This is where the bandwidth of the controller is defined.
   - b. Magnitude inside the bandwidth needs to be between 1.2 Gpp and 1.6 Gpp.
3. Sharp
   - a. Envelope of the response is not considered because the characterized pulses produced is always an envelope close to maximum value.
   - b. Magnitude inside the bandwidth needs to be between 1 Gpp and 1.6 Gpp.

In one embodiment, the envelope constraint will select certain points (pulse widths) in the Envelope vs. Frequency graphs, and since each point in these graphs corresponds to a point in the Magnitude vs. Frequency graphs, automatically there is a selection of points in magnitude that will be used to select the controller parameters.

Figure 14:
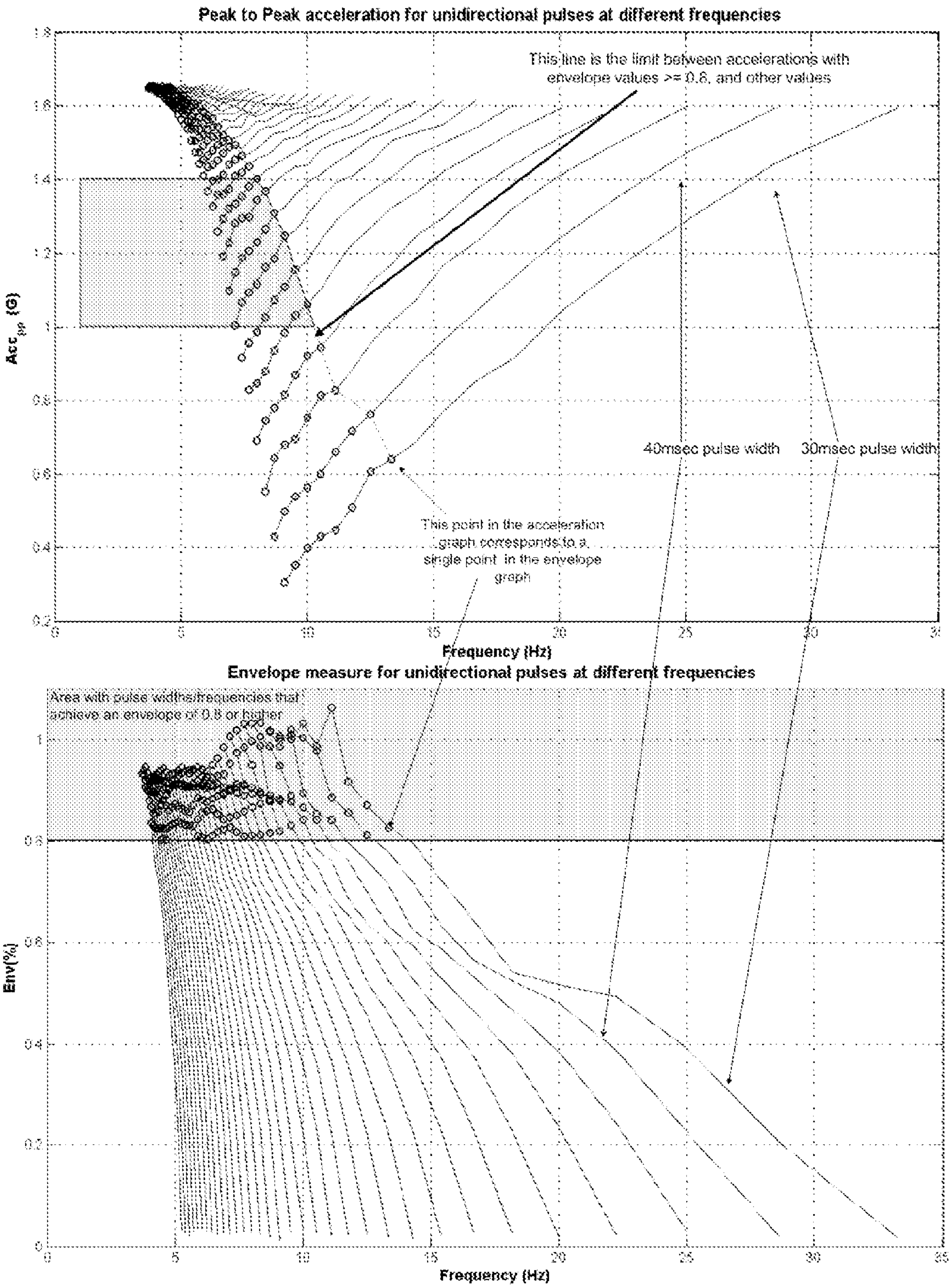
FIGS. 14-16 graphically illustrate a procedure of a selection of points in magnitude that are used to select the controller parameters in accordance with one embodiment of the present invention.
Figure 15:
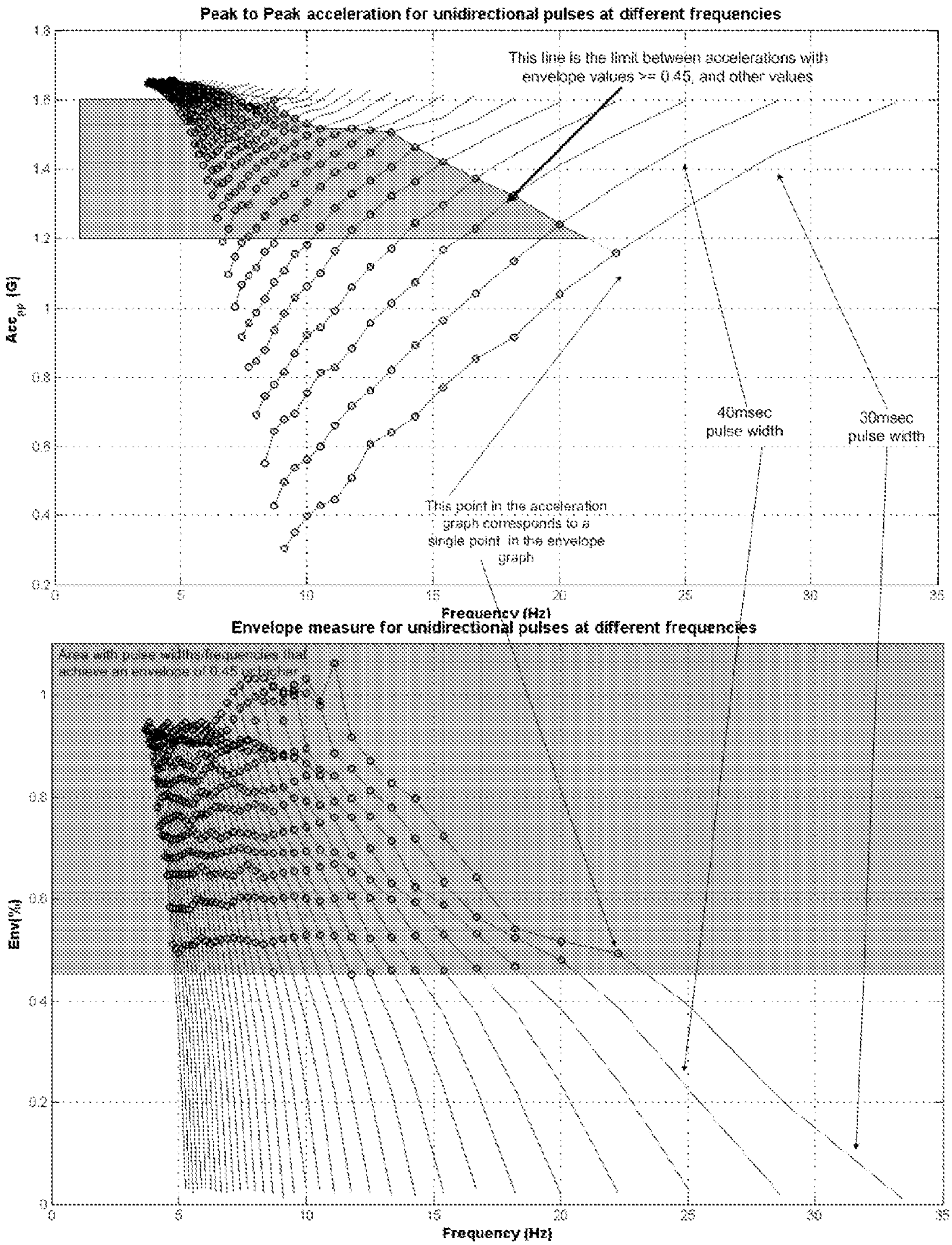
Figure 16:
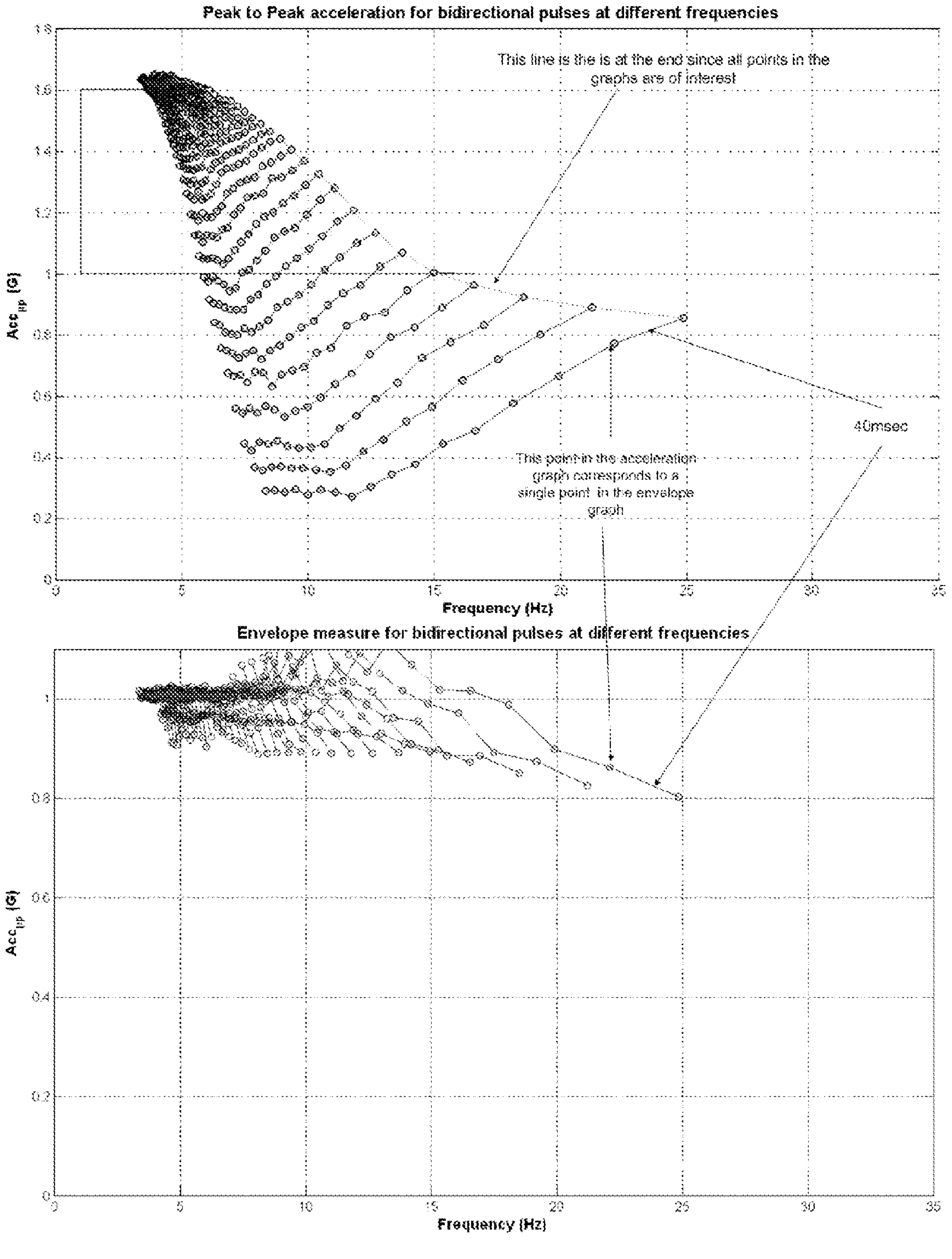

This procedure is presented in graphical form for each controller of the new handset in FIGS. 14-16. The darkened area in the magnitude plots represents the region where the controller parameters will be found and is given by the constraints stated above.

For each darkened area, the superposition of the reference data as in FIG. 4, could give the parameters of the controllers for a specific actuator. However, since not all the actuators behave in a similar fashion and therefore do not have similar performance values, superimposing the reference data could result in a mismatch between values, making impossible the implementation of the controllers because the reference data values might not be achieved by the new actuator. For this reason, only the darkened area is considered in one embodiment, and the goal becomes finding only the "largest bandwidth" for each controller.

The "largest bandwidth" is found by selecting a point inside the darkened area with the highest frequency value. This point will result in a pulse width and a duty cycle. Then, a second point different from the first one, inside the darkened area will be found with a similar duty cycle. These are the most important values that the controller will be using in its final implementation.

Loading the Kernel with the Control Parameters

Once the controller parameters (disclosed in more detail below) are computed, the kernel is fed with these values and the characterization of the controller with the new actuator can be obtained. In one embodiment, the kernel implementation considers an array of values that the controller can access at run time. This array of values contains the controller parameters and are given/downloaded/transmitted to the handset and stored in memory where the controller can access them when a haptic effect is commanded. The parameters can also be compiled as part of the binary that resides in the handset. The resulting performance graphs for the new handset should be very similar to the graph shown in FIG. 4, which results in the new handset having haptic effects consistent with those in the reference handset.

LRA Controller Parameters

In one embodiment, when LRA actuators rather than ERM actuators are implemented, it is desirable to adjust the set of tests performed disclosed above to obtain the controller parameters. In one embodiment, the generation of drive and brake pulses is done similarly as disclosed above, but the pulses are enveloped with a square wave with the frequency set at the resonance frequency of the actuator. The optimal brake time is determined using the same method previously disclosed.

Figure 17:
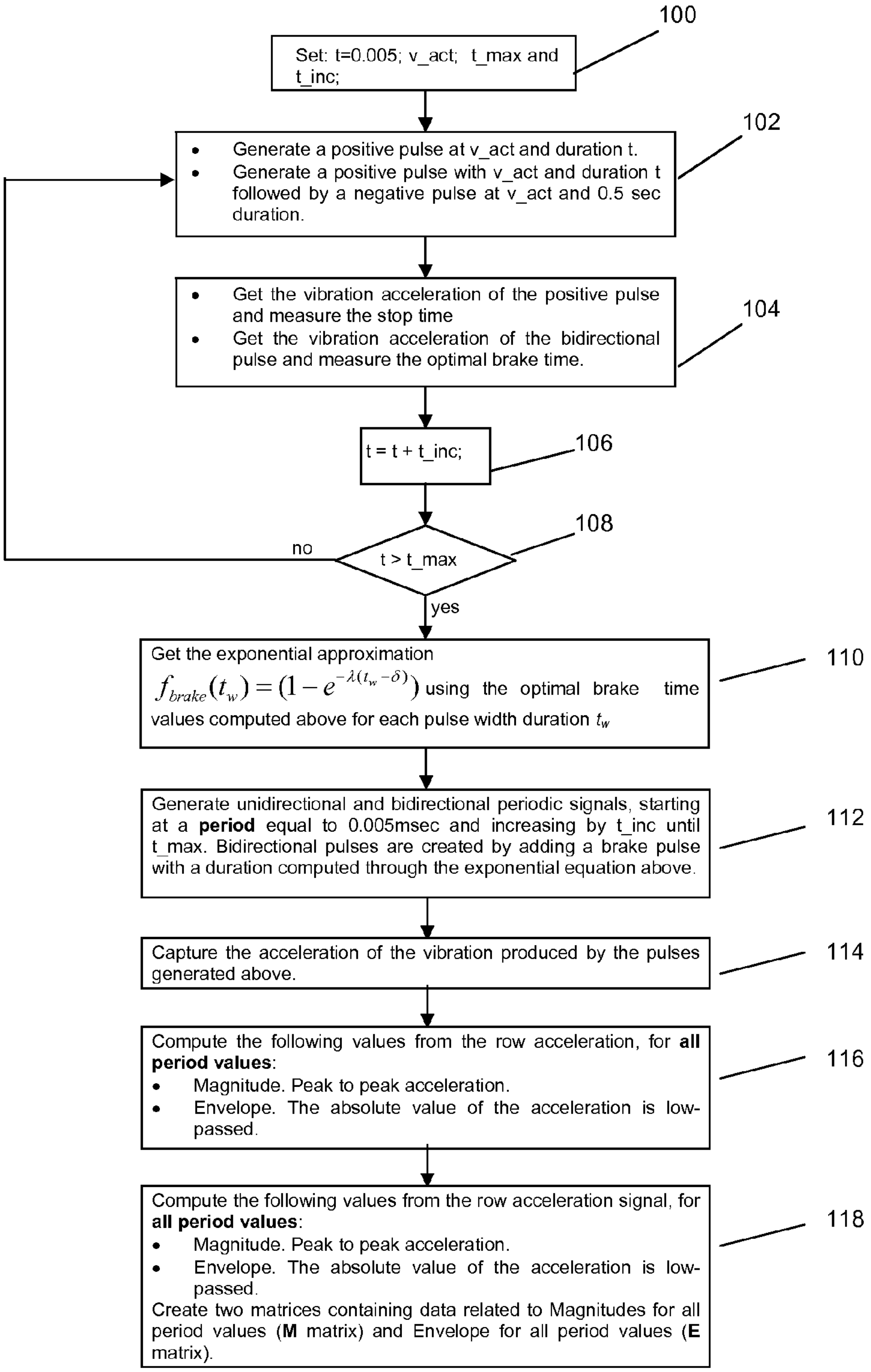
FIGS. 17 and 18 are flow diagrams of the functionality performed by a computer in order to: (1) find the stop and brake time; (2) generate the raw data (i.e., matrices); and (3) determine the controller parameters so that a new handset will have haptic effects consistent with those in a reference handset in accordance with one embodiment of the present invention.
Figure 18:
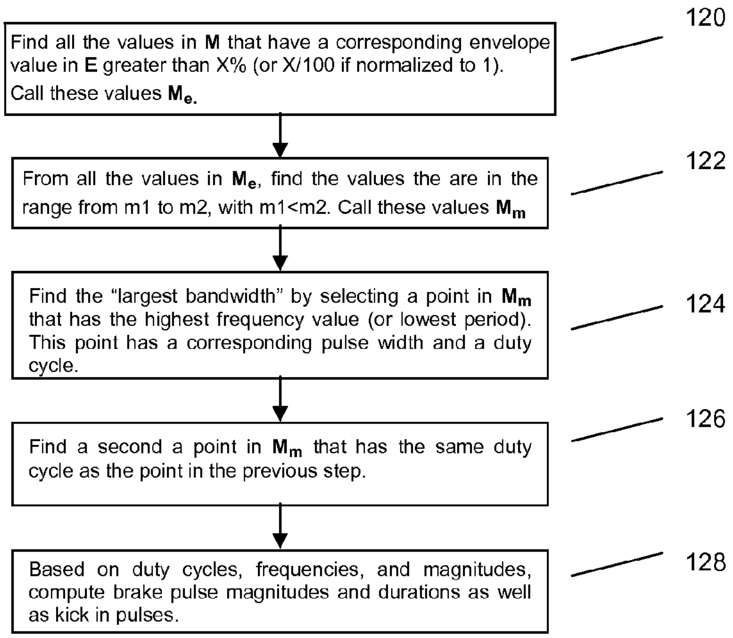

Although steps of embodiments of the present invention are described graphically above, in one embodiment these steps are automatically performed by a computer coupled to an accelerometer. The computer includes a processor and memory. FIGS. 17 and 18 are flow diagrams of the functionality performed by the computer in order to: (1) find the stop and brake time; (2) generate the raw data (i.e., matrices); and (3) determine the controller parameters so that a new handset will have haptic effects consistent with those in the reference handset. In one embodiment, the functionality of FIGS. 17 and 18 is implemented by software stored in a memory and executed by a processor. In one embodiment, the software is the MATLAB® programming language. In other embodiments, the functionality can be performed by hardware, or any combination of hardware and software.

(100) Variables are created and set—Set: t=0.005; v_act; t_max and t_inc.

(102) Generate a positive pulse at v_act and duration t. Generate a positive pulse with v_act and duration t followed by a negative pulse at v_act and 0.5 second duration.

(104) Get the vibration acceleration of the positive pulse and measure the stop time. Get the vibration acceleration of the bidirectional pulse and measure the optimal brake time.

(106) Calculate t=t+t_inc.

(108) Determine if t is greater than t_max. If no, go to 102. If yes, go to 110.

(110) Get the exponential approximation $f_{brake}(t_w)=(1-e^{-\lambda(t_w-\delta)})$ using the optimal brake time values computed previously for each pulse width duration $t_w$ (112) Generate unidirectional and bidirectional periodic signals, starting at a period equal to 0.005 ms and increasing by t_inc until t_max. Bidirectional pulses are created by adding a brake pulse with a duration computed through the exponential equation of 110.

(114) Capture the acceleration of the vibration produced by the pulses generated at 112 from the accelerometer.

(116) Compute the following values from the row acceleration, for all period values: (1) Magnitude—Peak to peak acceleration; (2) Envelope—The absolute value of the acceleration is low-passed.

(118) Compute the following values from the row acceleration signal, for all period values: (1) Magnitude—Peak to peak acceleration; (2) Envelope—The absolute value of the acceleration is low-passed. Create two matrices containing data related to Magnitudes for all period values (M matrix) and Envelope for all period values (E matrix).

The matrices M and E are created for both unidirectional and bidirectional pulses and each value corresponds to a combination of period and magnitude or period and envelope. Therefore, for each period there will be a magnitude and an envelope associated with it. For unidirectional pulses the matrices are referred to as $M_u$ and $E_u$ and for bidirectional pulses $M_b$ and $E_b$.

(120) Find all the values in M that have a corresponding envelope value in E greater than X % (or X/100 if normalized to 1). Refer to these values as $M_e$.

(122) From all the values in $M_e$, find the values that are in the range from m1 to m2, with m1<m2. Refer to these values as $M_m$.

(124) Find the "largest bandwidth" by selecting a point in $M_m$ that has the highest frequency value (or lowest period). This point has a corresponding pulse width and a duty cycle.

(126) Find a second a point in $M_m$ that has the same duty cycle as the point in 124.

(128) Based on duty cycles, frequencies, and magnitudes, compute brake pulse magnitudes and durations as well as kick in pulses.

The algorithm of 120-128 is executed to find the parameters for one of the controllers, and is repeated as necessary for each controller. In one embodiment, for a smooth controller, X=80%, m1=1 G, and m2=1.4 G. For a strong controller X=45%, m1=1.2, and m2=1.6. For a sharp controller the matrix $M_e$ is created using only the magnitude constraint.

In one embodiment, each controller in a kernel of a handset has a set of controller parameters. The value of the parameters will determine the resulting command signals generated by the kernel. Table 1 below is a list of a set of controller parameters in accordance with one embodiment of the present invention.

TABLE 1

| Param. # | Parameter name | Description |
|---|---|---|
| 1 | TRANSITION FREQ | Delimits "fixed on-time per period" to "on-time as a percentage of the period". Frequencies below this value are considered to be in the low frequency range. |
| 2 | TRANSITION FREQ2 | Delimits middle frequency range where On-time is a percentage of the requested period. The Middle Frequency Range is given by the value in row one and this value. |
| 3 | ON TIME LOWFREQ | Duration of the positive and negative pulses in the low frequency range. |
| 4 | ON POS TIME LOWFREQ DC | Duration of positive pulse in the low frequency rage. |
| 5 | ON NEG TIME LOWFREQ DC | Duration of negative pulse in the low frequency range. Note that this duration plus the duration of the positive pulse in the above row might not be equal to the total duration of the pulse in row three. |
| 6 | ERM ON TIME MIDFREQ | Percentage value of the commanded period to be used as the duration of the pulse. This value is in the range of 0 to 255 (equivalent to 100%). Note that this value is usually 255; a smaller value indicates that the desired pulse is smaller that the actual commanded period. |
| 7 | ERM ON POS TIME MIDFREQ PERC | Percent of the total pulse duration to be used as the width of the positive pulse. |

Handset Structure Considerations

The systems and methods disclosed above consider attributes of a reference actuator and attributes of an actuator of a "new" device in order to achieve consistent haptic effects among handsets. However, no specific consideration of the structure of the handsets is taken into account. In one embodiment, in order to have a more complete method for insuring consistency among handsets, the following features, disclosed in more detail below, can also be considered to generate consistent effects between two different handsets:

1. Placement of motor and orientation inside the handset;
2. Handset casing or type (e.g., clam, bar, slider);
3. Handset mass; and
4. Source of vibration frequency.

Placement of Motor and its Orientation Inside the Handset

In one embodiment, a reference handset for placement and orientation of the motor considerations is created for comparison purposes. This reference handset may be the reference handset disclosed in conjunction with FIG. 3 above, where the actuator parameters have been tuned manually to achieve "good results", or it may be a handset that has been tuned using the consistency method for actuators disclosed above.

Figure 19:
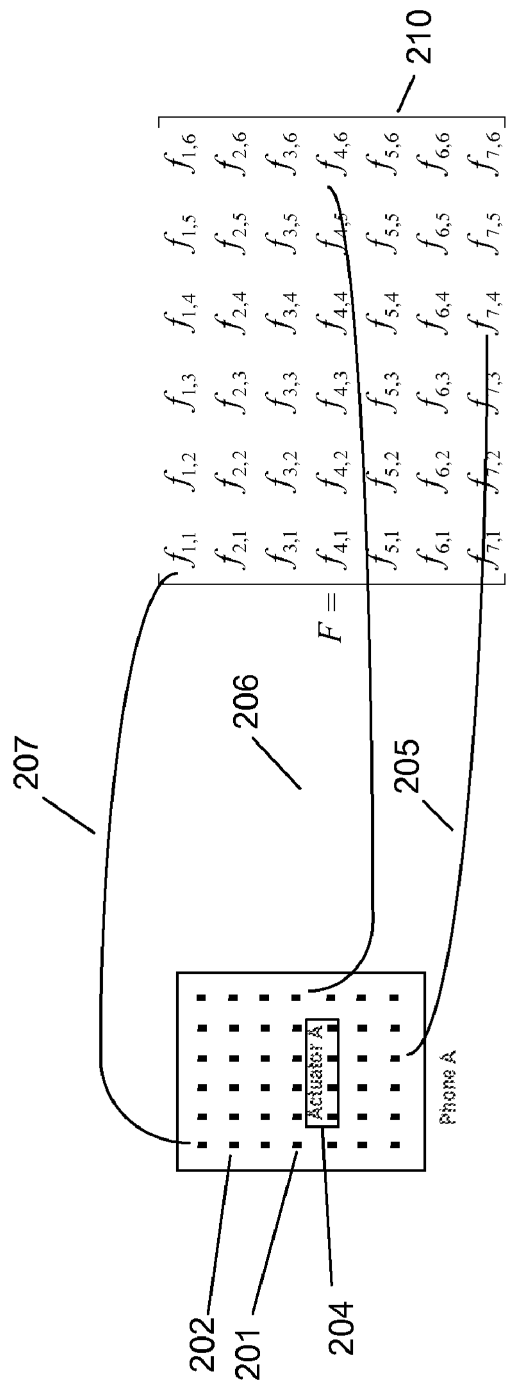
FIG. 19 is a block diagram of a reference handset in accordance with one embodiment of the present invention and a corresponding features matrix.

The reference handset is first characterized by capturing its accelerations at different locations on the handset. FIG. 19 is a block diagram of a reference handset ("phone A") in accordance with one embodiment of the present invention and a corresponding features matrix 210. Phone A includes multiple locations (e.g., locations 201, 202, etc.) for placement of an accelerometer, and an actuator 204 at the illustrated location. At this point the location of the actuator inside phone A is not known, but it is known that phone A produces acceptable vibration to the user. There is a one to one correspondence between the locations of the accelerometer in phone A (201, 202, etc.) and the elements of features matrix 210. Lines 205-207 illustrate the mapping between some of the physical locations on phone A and the elements of features matrix 210.

Features matrix 210 will be generated for specific features metrics. FIG. 20 illustrates two examples of features matrix 210 (matrices 215, 216). Matrix 215 is comprised of the measured peak to peak acceleration at the specified locations on phone A. Matrix 216 is comprised of the stop time of the measured accelerations, which is the time measured from the moment the input excitation is removed, to the time the peak acceleration (vibration) is under the perception threshold value. A matrix comprised of the rise time of the measure acceleration can also be generated, which is the time measured from the start of the input signal to the time where 50% of the maximum acceleration is reached. Other type of sensors, like the position sensor, could be used to characterize the handset vibrations. In such cases, similar feature matrices can be extracted.

The features matrix is used as a reference to compare to other handsets. This matrix is called "$F_R$". A second handset (target phone B) will have a features matrix that matches the reference feature matrix, and will have actuator B placed inside target phone B such that the reference and target matrices match.

Figure 21:
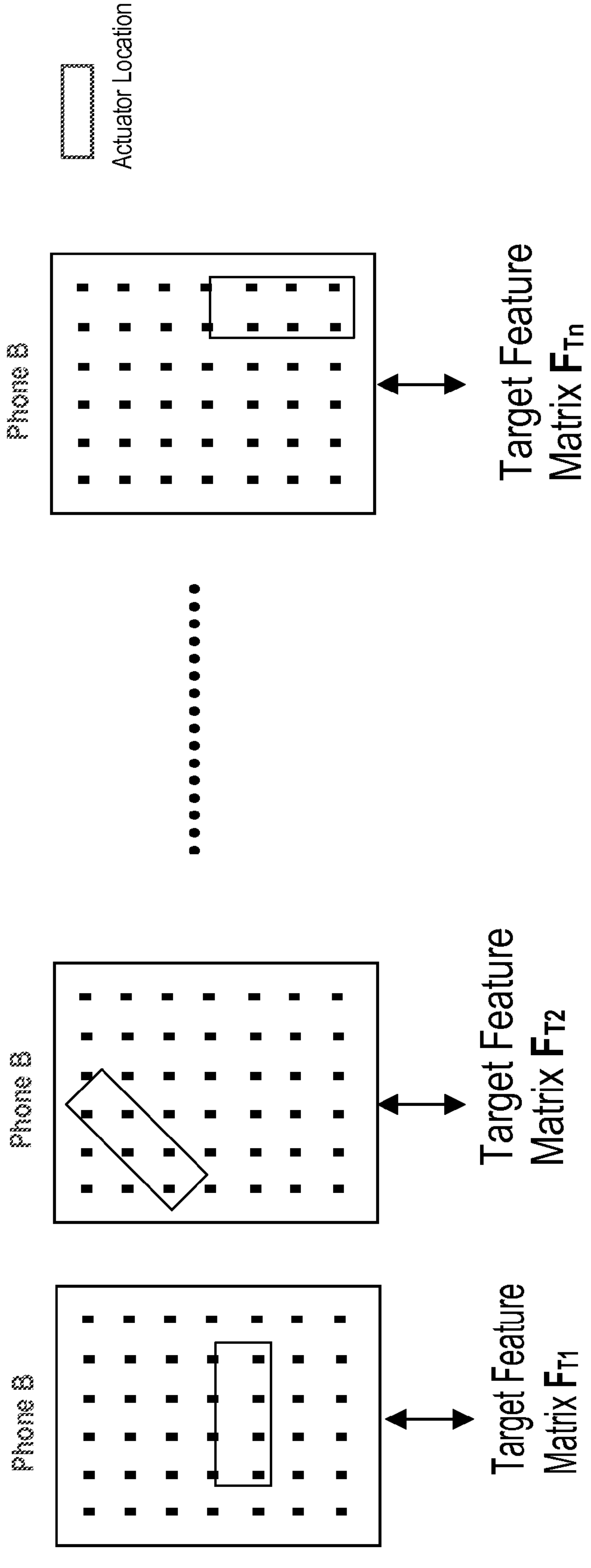
FIG. 21 illustrates the extraction of feature matrices for different positions of phone B.

FIG. 21 illustrates the extraction of feature matrices for different positions of phone B. In order to find the matrix that best matches the reference features matrix, whenever a target matrix $F_{Ti}$ is captured for a specific location of the actuator inside the target phone B, this target matrix $F_{Ti}$ is compared to the reference feature matrix $F_R$. From all the possible (feasible) location of the actuator B inside the target phone B, there will be one matrix that best matches the reference feature matrix.

Matching the features matrices involves the use of some metrics that make the two handsets consistent with each other. The metrics could involve one of the features or a combination of them, and the matching could be a straight linear comparison or a more complex metric.

Once the location and orientation of the actuator has been found, the controller parameters are computed as above in order to achieve the best possible consistency between the two handsets.

Handset Casing or Type (e.g., Clam, Bars Slider)

In one embodiment, to obtain the best consistency among different casings/types of handsets, a reference phone is selected for each type of casing. Each reference phone and corresponding features matrix is created as disclosed in conjunction with FIG. 19.

Handset Mass and Source of Vibration Frequency

It is known that the perceived vibration of a handset by a user is influenced by the mass of the handset and the frequency of the vibrations (directly related to the actuator). The information on how the mass of the handset and the source of vibration frequency influence the resulting vibrations can be included when determining controller parameters as disclosed above and in FIGS. 17 and 18. For example, in one embodiment the controller parameters will be obtained by applying the previously disclosed consistency methods to match two different actuators A and B, followed by a modification to the parameters or performance metrics by applying perception metrics to compensate for mass and vibration frequency.

In this embodiment, the perception metrics are created so that the influence of mass and frequency is reflected in the acceleration of the device, thus creating relationships between mass versus acceleration and frequency versus acceleration. The reason for such an arrangement is that these relations can be applied directly to the actuator performance metrics where the kernel parameters are obtained.

Figure 22:
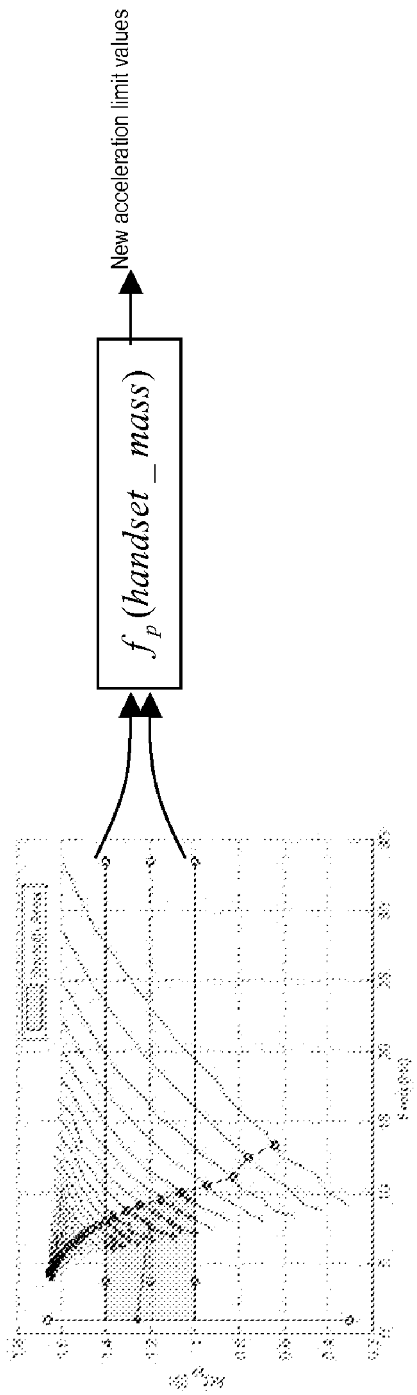
FIG. 22 is a graphical illustration of how perceptions relationships can be applied when determining controller parameters.

FIG. 22 is a graphical illustration of how the relationships can be applied. The upper and lower acceleration limits of the shaded area superimposed on the magnitude graph, under normal conditions, are set to a specific value ($m_1$ and $m_2$). In order to compensate for the device's weight, these limits are "scaled" by a function $f_p^{mass}$ (referred to as the "mass perception function") which results in different limit values for a device with a specific weight that produces consistent vibrations as the ones produced by the reference device.

To compensate for the vibration frequency of the actuator, the reference and target actuators are characterized by measuring the range of frequencies they can generate. Specifically, the frequency produced at the maximum acceleration generated by the actuators are measured (which corresponds to the maximum voltage used by the actuator). Then, a perception function $f_p^{freq}$ (referred to as the "frequency perception function") is used to scale the limit values $m_1$ and $m_2$, after they have been scaled by the perception function $f_p^{mass}$.

After the limits $m_1$ and $m_2$ have been scaled appropriately, the computation of the controller parameters can be performed as disclosed above and in FIGS. 17 and 18. All the acceleration limits should be scaled (for the Smooth, Strong and Sharp controllers).

Figure 23:
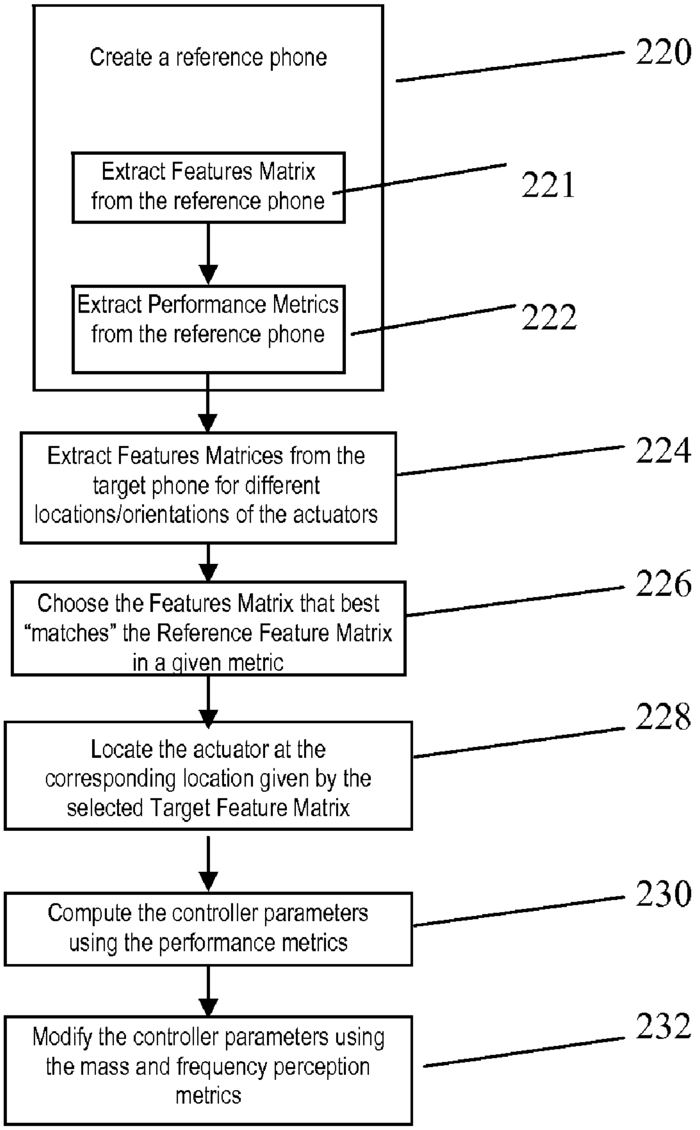
FIG. 23 is a flow diagram of the functionality performed by a computer in order to include perception metrics when determining controller parameters.

FIG. 23 is a flow diagram of the functionality performed by a computer in order to include perception metrics when determining controller parameters. In one embodiment, the functionality of FIG. 23 is implemented by software stored in a memory and executed by a processor. In one embodiment, the software is the MATLAB® programming language. In other embodiments, the functionality can be performed by hardware, or any combination of hardware and software.

(220) A reference handset/phone is created by extracting a features matrix from the reference phone (221) and extracting performance metrics from the reference phone (222).

(224) Features matrices from the target phone are extracted for different locations/orientations of the actuators.

(226) The features matrix is chosen that best "matches" the reference feature matrix in a given metric.

(228) The actuator is located at the corresponding location given by the selected target feature matrix.

(230) The controller parameters are determined using the performance metrics.

(232) The controller parameters are modified using the mass and frequency perception metrics.

As disclosed, one embodiment of the present invention allows a new handset to have haptic effects consistent with a reference handset by modifying controller parameters within the kernel of the new handset. The physical structure of the new handset can also be taken into account when modifying the controller parameters. This allows a user to have a similar experience across many different handsets.

The embodiments disclosed above to create a consistent feeling across handsets generally involve the storing of parameters on the specific handset. Therefore, haptic effects can be designed once for a reference handset and then deployed across many different handsets. This avoids the need to redesign the effects for each handset. In another embodiment, a design tool or application stores the motor parameter information. The new motor or handset controller parameters are determined in a similar fashion as above, however the design tool, not the handset, is used to generate actuator and handset specific content that would be played on the targeted handset.

Another embodiment of the present invention is a system and method which, based on a defined "reference" touch surface input device and haptic effects that are designed for the reference device, allows the same haptic effects to feel consistent to a user on other types of touch surface devices without having to modify the haptic effects.

This can be accomplished by determining performance parameters for the actuators that power the haptic touch surface device. For touch surface haptic devices the actuator performance parameters may include such things as the magnitude and frequency of the generated acceleration, the magnitude and frequency of the displacement of the touch surface, and the rise and stop time of the generated acceleration or displacement.

Device parameters can also be measured and a features matrix determined for touch surface devices to be used for consistency determination. For touch surface devices the following parameters could be used to determine the controller parameters: mass of the touch surface, size of the touch surface, orientation of the touch surface, the amount and type of sealing required for the device, and the overall system resonance.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, some embodiments disclosed above are implemented in a cellular telephone, which is an object that can be grasped, gripped or otherwise physically contacted and manipulated by a user. As such, the present invention can be employed on other haptics enabled input and/or output devices that can be similarly manipulated by the user. Such other devices can include a touch screen (Global Positioning System ("GPS") navigator screen on an automobile, an automated teller machine ("ATM") display screen), a remote for controlling electronics equipment (audio/video, garage door, home security, etc.) and a gaming controller (joystick, mouse, specialized controller, etc.). The operation of such input and/or output devices is well known to those skilled in the art.

What is claimed is:

1. A method of generating a consistent vibratory haptic effect in a second device having a second actuator that generates a vibration on the second device, said method comprising:

determining second performance data for the second actuator; and generating haptic effect controller parameters from said second performance data by comparing the second performance data with reference performance data for a reference actuator;

wherein the reference performance data comprises a measure of an envelope across a range of frequencies of the reference actuator, and wherein the measure comprises a percentage of peak acceleration of vibration with respect to a size of the envelope.

2. The method of claim 1, further comprising:

storing the controller parameters on the second device.

3. The method of claim 1, wherein determining second performance data comprises:

finding the maximum and optimal stop time for different pulse widths for the second actuator.

4. The method of claim 1, wherein determining second performance data comprises:

generating pulses at different frequencies to generate pulse widths;

capturing acceleration profiles for each pulse width;

measuring magnitude and envelope values from the captured acceleration profiles; and storing the measured data in a first matrix of magnitude vs. frequency and a second matrix of envelope vs. frequency.

5. The method of claim 4, wherein the generating pulses at different frequencies comprises generating unidirectional and bidirectional pulses.

6. The method of claim 4, wherein the generating controller parameters from said performance data comprises:

finding an intersection of the measured data in the first and second matrices with the reference performance data.

7. The method of claim 2, wherein storing the controller parameters on the second device comprises loading a kernel of the second device with the controller parameters.

8. The method of claim 1, wherein the reference performance data comprises magnitude and acceleration data of the reference actuator of a reference device.

9. The method of claim 1, wherein the determining second performance data comprises coupling an accelerometer to the second actuator.

10. The method of claim 1, wherein the second device is a wireless mobile handset.

11. The method of claim 1, further comprising:

generating a reference features matrix based on measurements at a plurality of locations on a reference device that houses the reference actuator;

generating a plurality of second features matrices for each of a plurality of positions of the reference actuator within the second device;

selecting one of the second features matrices that best matches the reference features matrix; and locating the reference actuator within the second device based on the selected second features matrix.

12. The method of claim 1, further comprising:

modifying the haptic effect controller parameters using a mass and perception metrics.

13. An apparatus for generating a consistent vibratory haptic effect in a second device having a second actuator that generates a vibration on the second device, said apparatus comprising:

means for determining second performance data for the second actuator; and means for generating haptic effect controller parameters from said second performance data by comparing the second performance data with reference performance data for a reference actuator;

wherein the reference performance data comprises a measure of an envelope across a range of frequencies of the reference actuator, and wherein the measure comprises a percentage of peak acceleration of vibration with respect to a size of the envelope.

14. The apparatus of claim 13, further comprising:

means for storing the controller parameters on the second device.

15. The apparatus of claim 13, wherein said means for determining second performance data comprises:

means for finding the maximum and optimal stop time for different pulse widths for the second actuator.

16. The apparatus of claim 13, wherein said means for determining second performance data comprises:

means for generating pulses at different frequencies to generate pulse widths;

means for capturing acceleration profiles for each pulse width;

means for measuring magnitude and envelope values from the captured acceleration profiles; and means for storing the measured data in a first matrix of magnitude vs. frequency and a second matrix of envelope vs. frequency.

17. The apparatus of claim 16, wherein said means for generating controller parameters from said performance data comprises:

means for finding an intersection of the measured data in the first and second matrices with the reference performance data.

18. The apparatus of claim 13, further comprising:

means for generating a reference features matrix based on measurements at plurality of locations on a reference device that houses the reference actuator;

means for generating a plurality of second features matrices for each of a plurality of positions of the reference actuator within the second device;

means for selecting one of the second features matrices that best matches the reference features matrix; and means for locating the reference actuator within the second device based on the selected second features matrix.

19. The apparatus of claim 13, further comprising:

means for modifying the haptic effect controller parameters using a mass and perception metrics.

20. A computer readable medium having instructions stored thereon that, when executed by a processor, cause the processor to create a consistent vibratory haptic effect in a second device having a second actuator that generates a vibration on the second device by:

determining second performance data for the second actuator; and generating haptic effect controller parameters from said second performance data by comparing the second performance data with reference performance data for a reference actuator;

wherein the reference performance data comprises a measure of an envelope across a range of frequencies of the reference actuator, and wherein the measure comprises a percentage of peak acceleration of vibration with respect to a size of the envelope.

21. The computer readable medium of claim 20, said instructions further causing said processor to:

store the controller parameters on the second device.

22. The computer readable medium of claim 20, wherein determining second performance data comprises:

finding the maximum and optimal stop time for different pulse widths for the second actuator.

23. The computer readable medium of claim 20, wherein determining second performance data comprises:

generating pulses at different frequencies to generate pulse widths;

capturing acceleration profiles for each pulse width;

measuring magnitude and envelope values from the captured acceleration profiles; and storing the measured data in a first matrix of magnitude vs. frequency and a second matrix of envelope vs. frequency.

24. The computer readable medium of claim 23, wherein the generating pulses at different frequencies comprises generating unidirectional and bidirectional pulses.

25. The computer readable medium of claim 23, wherein the generating controller parameters from said performance data comprises:

finding an intersection of the measured data in the first and second matrices with the reference performance data.

26. The computer readable medium of claim 20, said instructions further causing said processor to:

generate a reference features matrix based on measurements at a plurality of locations on a reference device that houses the reference actuator;

generate a plurality of second features matrices for each of a plurality of positions of the reference actuator within the second device;

select one of the second features matrices that best matches the reference features matrix; and locate the reference actuator within the second device based on the selected second features matrix.

27. The computer readable medium of claim 20, said instructions further causing said processor to:

modify the haptic effect controller parameters using a mass and perception metrics.

28. A system for creating a consistent vibratory haptic effect in a second device having a second actuator that generates a vibration on the second device, said system comprising:

a processor;

a memory coupled to said processor;

a first interface to the second device; and a second interface to an accelerometer;

wherein said memory stores instructions that, when executed by said processor, cause said processor to:

determine second performance data for the second actuator; and generate haptic effect controller parameters from said second performance data by comparing the second performance data with reference performance data for a reference actuator;

wherein the reference performance data comprises a measure of an envelope across a range of frequencies of the reference actuator, and wherein the measure comprises a percentage of peak acceleration of vibration with respect to a size of the envelope.

29. The system of claim 28, said instructions further causing said processor to:

store the controller parameters on the second device.

30. The system of claim 28, wherein determining second performance data comprises:

finding the maximum and optimal stop time for different pulse widths for the second actuator.

31. The system of claim 28, wherein determining second performance data comprises:

generating pulses at different frequencies to generate pulse widths;

capturing acceleration profiles for each pulse width;

measuring magnitude and envelope values from the captured acceleration profiles; and storing the measured data in a first matrix of magnitude vs. frequency and a second matrix of envelope vs. frequency.

32. The system of claim 31, wherein the generating pulses at different frequencies comprises generating unidirectional and bidirectional pulses.

33. The system of claim 31, wherein the generating controller parameters from said performance data comprises:

finding an intersection of the measured data in the first and second matrices with the reference performance data.

34. The system of claim 28, wherein said first interface is coupled to said second actuator.

35. The system of claim 28, said instructions further causing said processor to:

generate a reference features matrix based on measurements at a plurality of locations on a reference device that houses the reference actuator;

generate a plurality of second features matrices for each of a plurality of positions of the reference actuator within the second device;

select one of the second features matrices that best matches the reference features matrix; and locate the reference actuator within the second device based on the selected second features matrix.

36. The system of claim 28, said instructions further causing said processor to:

modify the haptic effect controller parameters using a mass and perception metrics.

37. A method of generating a consistent vibratory haptic effect in a second device having a second actuator that generates a vibration on the second device, said method comprising:

determining second performance data for the second device; and generating haptic effect controller parameters from said second performance data by comparing the second performance data with reference performance data for a reference device;

wherein the reference performance data comprises a measure of an envelope across a range of frequencies of the reference actuator, and wherein the measure comprises a percentage of peak acceleration of vibration with respect to a size of the envelope.

38. The method of claim 37, further comprising:

storing the controller parameters on the second device.

39. The method of claim 37, wherein the second actuator is not in the same location in the second device as a first actuator in the first device.

* * * * *